(12) United States Patent
Singhal

(10) Patent No.: US 6,938,022 B1
(45) Date of Patent: Aug. 30, 2005

(54) METHOD AND APPARATUS FOR FACILITATING AN ANONYMOUS INFORMATION SYSTEM AND ANONYMOUS SERVICE TRANSACTIONS

(76) Inventor: Tara C. Singhal, P.O. Box 5075, Torrance, CA (US) 90510

( * ) Notice: Subject to any disclaimer, the term of this patent is extended or adjusted under 35 U.S.C. 154(b) by 0 days.

(21) Appl. No.: 09/570,232

(22) Filed: May 12, 2000

Related U.S. Application Data

(60) Provisional application No. 60/144,737, filed on Jul. 21, 1999, provisional application No. 60/139,101, filed on Jun. 12, 1999.

(51) Int. Cl.[7] ............................................. G06F 17/60
(52) U.S. Cl. .............................. 705/74; 705/78; 705/75
(58) Field of Search ............................. 705/74, 78, 51, 705/64, 75

(56) References Cited

U.S. PATENT DOCUMENTS

| | | | |
|---|---|---|---|
| 4,408,203 A | | 10/1983 | Campbell |
| 5,606,610 A | * | 2/1997 | Johansson ...................... 380/4 |
| 5,666,420 A | | 9/1997 | Micali |
| 5,668,878 A | | 9/1997 | Brands |
| 5,689,652 A | | 11/1997 | Lupien et al. |
| 5,732,400 A | * | 3/1998 | Mandler et al. ............... 705/26 |
| 5,815,665 A | * | 9/1998 | Teper et al. ............ 395/200.59 |
| 5,855,018 A | * | 12/1998 | Chor et al. ...................... 707/9 |
| 5,862,223 A | * | 1/1999 | Walker et al. ................. 380/25 |
| 5,923,842 A | | 7/1999 | Pedersen et al. |
| 5,956,400 A | * | 9/1999 | Chaum et al. .................. 380/4 |
| 5,987,440 A | * | 11/1999 | O'Neil et al. .................. 705/44 |

(Continued)

FOREIGN PATENT DOCUMENTS

WO   WO 98/19224 A2 * 5/1998

OTHER PUBLICATIONS

Pages downloaded from: www.lendingtree.com.

*Primary Examiner*—John W. Hayes
(74) *Attorney, Agent, or Firm*—Steve Roeder

(57) ABSTRACT

An information system (12) for storing personal information of a customer (20) is provided herein. The customer (20) preferably communicates with the information system (12) using the Internet. Further, the customer (20) preferably uses an anonymous identifier (320) to gain access to the information system (12). The customer (20) can create the anonymous identifier (320) to assure anonymity and to facilitate anonymous and secure transactions over the Internet. Some or all of the personal information of the customer (20) is preferably electronically shredded and defaced before storage in the information system (12). This feature allows the customer (20) to maintain private data (25) in the information system (12) anonymously and shields the private data (25) from even the operators of the information system (12). In addition to maintaining the private data (25), the information system (12) allows the customer (20) to anonymously receive an estimate on a service and/or receive a service (806) from the service merchant (22) without the merchant (22) knowing the identity of the customer (20). Examples of services (806) that may be received from service merchants (22) include an insurance quote for a vehicle, an insurance quote for a structure, a life insurance quote, a health insurance quote, an insurance quote on some other item, a one time use of special software such as tax computation software, a quote on a loan, interest rates for a loan application, and clothing that is custom tailored.

38 Claims, 15 Drawing Sheets

U.S. PATENT DOCUMENTS

| | | |
|---|---|---|
| 5,991,414 A | 11/1999 | Garay et al. |
| 6,006,200 A | 12/1999 | Boies et al. |
| 6,023,510 A | 2/2000 | Epstein |
| 6,026,166 A | 2/2000 | LeBourgeois |
| 6,055,504 A | 4/2000 | Chou et al. |
| 6,061,789 A | 5/2000 | Hauser et al. |
| 6,078,906 A | 6/2000 | Huberman |
| 6,092,053 A * | 7/2000 | Boesch et al. ................ 705/26 |
| 6,148,342 A * | 11/2000 | Ho ............................ 709/225 |
| 6,148,404 A * | 11/2000 | Yatsukawa .................. 713/200 |
| 6,240,518 B1 * | 5/2001 | Ooki et al. .................. 713/201 |
| 6,253,203 B1 * | 6/2001 | O'Flaherty et al. ............ 707/9 |
| 6,268,789 B1 * | 7/2001 | Diamant et al. ............ 713/200 |
| 6,275,824 B1 * | 8/2001 | O'Flaherty et al. ............ 707/9 |
| 6,438,544 B1 * | 8/2002 | Grimmer et al. ............... 707/5 |
| 6,480,850 B1 * | 11/2002 | Veldhuisen .................... 707/9 |
| 2001/0011247 A1 * | 8/2001 | O'Flaherty et al. ........... 705/39 |
| 2002/0174352 A1 * | 11/2002 | Dahl .......................... 713/193 |

* cited by examiner

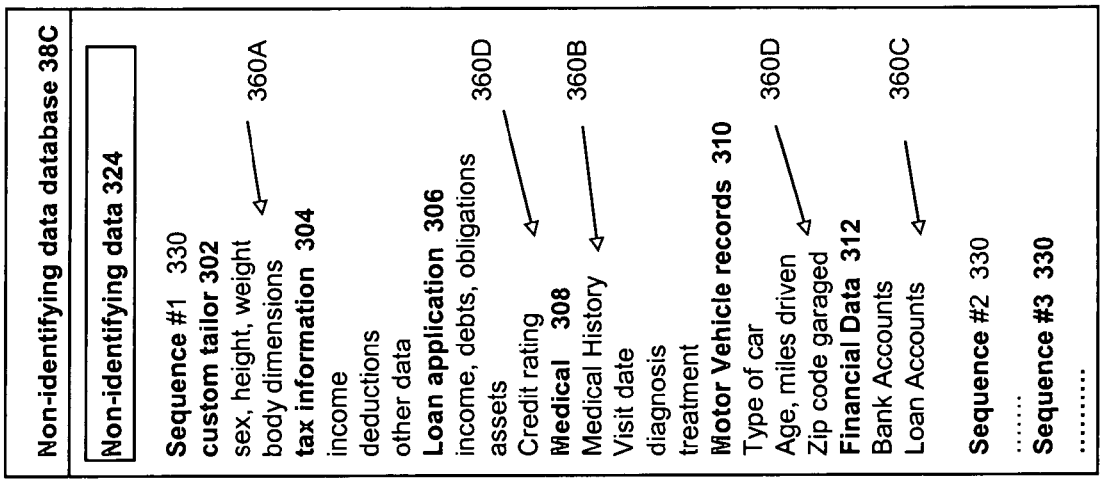
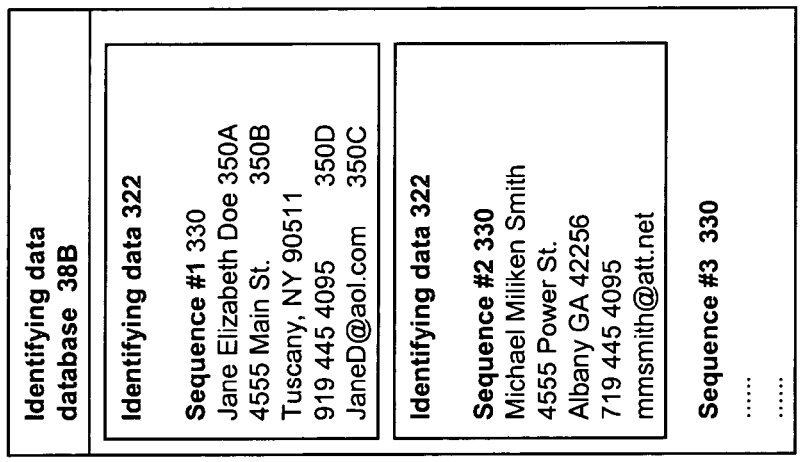
FIGURE 3A
FIGURE 3B
FIGURE 3C

Storage device 26

| First name List Data shred 710 | Middle Name List Data shred 712 | Last name List Data shred 714 | Street name List Data shred 716 | City name List Data shred 718 | State Name List Data shred 720 | ISP name List Data shred 722 |
|---|---|---|---|---|---|---|
| 1. James | 1. Johnson | 1. Horvath | 1. Main St. | 1. Albany | 1. California | 1. aol.com |
| 2. John | 2. Kevin | 2. Dunkin | 2. Charmin St. | 2. Stoughton | 2. Nebraska | 2. flash.com |
| 3. Mike | 3. Henson | 3. Marriott | 3. Gideon Rd. | 3. Plowshare | 3. Vermont | 3. att.net |
| ... | ... | ... | ... | ... | ... | ... |
| 1000. Kevin | 700. Timkin | 1100. Huggins | 500. Holden Ave | 400. Kyle | 52. Washington | 100. Home.com |

FIGURE 7A

| | |
|---|---|
| Input sequence number 330 | 780 |
| Input original number 701A-N of 3 digits | 782 |
| Create deface code 711A-N by finding first, second and third bounded Random Numbers (RN) 713 | 784 |
| Find privacy number 705A-N by offsetting first digit by first RN, second digit by second RN and third digit by third RN | 786 |
| Save privacy number 705A-N and defacing code 711A-N in data storage by Sequence number | 788 |
| Repeat for other numbers | 790 |

FIGURE 7B

| | |
|---|---|
| Input sequence number 330 | 792 |
| Read privacy number 705A-N | 794 |
| Read defacing code 711A-N | 796 |
| Un-deface to get original number 701A-N | 797 |
| Repeat for other numbers | 798 |

FIGURE 7C

| | |
|---|---|
| Input Sequence number 330 | 740 |
| Input Original name 701A-N | 742 |
| Find list position, or add to the list | 744 |
| Create defacing code 711A-N by finding first, second and third bounded Random Numbers 713 | 746 |
| Privacy list position = list position modified by first, second and third random numbers | 748 |
| Find privacy name from privacy list position | 750 |
| Save privacy name 705A-N & defacing code 711A-N in data storage by Sequence number | 752 |
| Repeat for other names | 754 |

FIGURE 7E

| | |
|---|---|
| Input Sequence number 330 | 760 |
| Read privacy name 705A-N | 762 |
| Find privacy list position | 764 |
| Read defacing code 711A-N | 766 |
| Un-deface list position for original list position | 768 |
| Find original name 701A-N | 770 |
| Repeat for other names | 772 |

FIGURE 7F

SERVICE MERCHANT WEB PAGE 802

CustomTailor.com 820

Have a custom tailored Suit
Select fabric ____ 822
Select Item ____ 824
Select Design/Style ____ 826
Enter personal data: 828
name
address
body dimension
Credit card Clear  Submit Custom Tailor With
Information
System 830

FIGURE 8B

SERVICE MERCHANT WEB PAGE 800

Insuranceworks.com 804

Apply for auto insurance
-- Auto Insurance Quote  806
Liability  808
Collision /Comprehensive ____ 810
Insurance Application: 812
personal data  814

Clear  Submit

Apply With
Information
System 816

FIGURE 8A

INFORMATION SYSTEM
IDENTIFYING DATA WEB PAGE  950

Personal Data Form 924A:
Name:
First: _____ Middle: _____ Last: _____
Address:
Number: _____ St. name _____ St. Type _____
City: _____ State _____ ZIP _____
Tel: _____ E-Mail _____

[SEND]

FIGURE 9B

INFORMATION SYSTEM
NON-IDENTIFYING DATA WEB PAGE  940

Auto Insurance Data Form 927:
Driver 1
Age:
Sex:
# of years license
# of tickets
# of accidents
Driver#2 same
Car #1
make/Model
Mileage driven
Car#2
make/model
mileage driven
zip code of garage
Coverage requested
Liability
Collision/Comprehensive

[SEND]

FIGURE 9C

PRIVATE INFORMATION SYSTEM
WEB PAGE 990

Merchant Id: _____ 991

-- Custom Tailoring 992
Fabric _____ 993
Style _____ 994
Item _____ 995

Create/Enter Anonymous Identifier
xxxx-xxxx-xxxxx   996
Select data type: body  997
Enter Payment Type:2   998

SEND
999

FIGURE 9E

PRIVATE INFORMATION SYSTEM
WEB PAGE 980

Merchant Id: _____ 982

-- Auto Insurance Quote  983
Liability _____ 984
Collision/Comprehensive _____ 985

Create/Enter Anonymous Identifier
xxxx-xxxx-xxxxx  986

Select data type: auto insurance 987

SEND
989

FIGURE 9D

METHOD AND APPARATUS FOR FACILITATING AN ANONYMOUS INFORMATION SYSTEM AND ANONYMOUS SERVICE TRANSACTIONS

CROSS REFERENCE TO RELATED APPLICATIONS

This application claims priority on Provisional Application Ser. No. 60/139,101, entitled "Internet-Based Anonymous Personal identification Number (APIN) System," filed on Jun. 12, 1999, by Tara Chand Singhal and Mukunda Singhal. This application also claims priority on Provisional Application Ser. No. 60/144,737, filed Jul. 21, 1999, entitled "INTERNET BASED ON-LINE PRIVACY GUARD SYSTEM," by Tara Chand Singhal. The contents of Provisional Application Ser. Nos. 60/139,101 and 60/144,737 are incorporated herein by reference.

This application also claims priority on co-pending application entitled "Method and Apparatus for Facilitating Anonymous Transactions", U.S. application Ser. No. 09/531,705, filed Mar. 20, 2000. The contents of application Ser. No. 09/531,705 are incorporated herein by reference.

FIELD OF THE INVENTION

The present invention is directed to a method and apparatus for facilitating anonymous service transactions. Further, the present invention is directed to a method and apparatus for protecting the privacy and private data of a customer in an information system on the global computer network. More specifically, the present invention is directed to a method and apparatus that uses private data stored in an information system to facilitate anonymous service transaction on the Internet.

BACKGROUND

Many people have personal information that they need to retain for future access. Additionally, many of these people desire to keep the personal information secret. Moreover, it is often desirable to keep this information at a secure and remote location.

The Internet is becoming a very easily accessible medium via the use of a desktop computer device, a lap top computer device, and/or handheld device. These devices may be wirelessly connected to the Internet. This gives the public a historically unprecedented access to and use of the resources of the Internet.

With this mind, a number of businesses have established online sites accessible via the Internet for backing up data on their computer. Because, the information is on the Internet, it is easily accessible to the user whenever and wherever they need to access it.

The prior art way for the user to gain access to their information in the online sites on the Internet typically includes two steps. The first step involves entering an identification character string, e.g. a user name, into the computer system. The identification character string is used to identify the user to the computer system. The second step involves entering a verification character string, e.g. a password. The verification character string is used to verify the identity of the user to the computer system.

Additionally, in order to take advantage of the increased Internet usage, many service merchants have established virtual services that can be accessed on the Internet. Some examples of such virtual services are completing loan applications, getting insurance quotes and completing tax forms.

A typical Internet service transaction involves (i) the customer browsing the virtual store of a particular service merchant, (ii) the customer providing personal information to the service merchant, and (iv) the service merchant providing the service. The personal information provided by the customer typically includes at least the name, address, and e-mail address of the customer. Further, the personal information provided to the service merchant can include credit card information of the customer and other personal information relevant to the service. With this information, the merchant provides the service and may charge the credit card of the customer and deliver the service results to the customer by e-mail.

Many times the service merchant collects the personal information of the customer and distributes the personal information to the actual service providers. For example, the customer may forward a mortgage loan application to a web service merchant. Subsequently, the web service merchant distributes the mortgage loan application to many different mortgage lenders to get multiple quotes on loans. Next, the quotes are forwarded to the customer to make a final selection.

Unfortunately, with this approach, even though the customer may select only one lender to enter into a contractual relationship, the personal and private information of the customer may have been distributed and copied into the databases of many lenders and the service merchant.

Many customers and/or potential customers are concerned that the personal information provided to the service merchants may not be secure. Stated another way, many customers and potential customers are concerned that their personal information may be misused by the merchant, disseminated by the merchant, and/or improperly accessed by third parties. In fact, many potential customers do not enter into service transaction(s) over the Internet because of the concern for the misuse and/or dissemination of their personal information by the service merchant.

In light of the above, it is an object of the present invention to provide an apparatus and method for protecting the privacy of a customer during an online service transaction. Another object of the present invention is to provide an apparatus and method for facilitating anonymous service transactions on the Internet. Still another object of the present invention is to provide an apparatus and method for minimizing the likelihood of the improper dissemination of the personal information of a customer. Yet another object of the present invention is to provide an apparatus and method for keeping private information in a remote information system.

SUMMARY

A method and apparatus for facilitating an anonymous information system for storing private data and also engaging in a service transaction using that private data between a customer and a merchant on the Internet is provided herein.

The present invention is useful for allowing the customer to shop around for the best insurance quote or loan terms without providing personal information to multiple service merchants before entering into a binding relationship with one of the merchants for the service.

A method pursuant to the present invention includes the steps of (i) creating an anonymous identifier, (ii) using the anonymous identifier for transferring to, storing and anchoring private information in the information system, (iii) transferring to the information system a service request by the customer to receive a service from the service merchant, (iv) providing an optional privacy payment to the service merchant to pay for the service, and (v) making an anonymous delivery of the service from the service merchant to the customer. The information system includes an operating system that is operative with the processor to perform these steps.

Importantly, the storing of private information in the information system is in preferably a form that does not identify the customer to the information system. Also, the personal data required for some services to be performed does not identify the customer. As a result thereof, the customer can receive a service from the service merchant, without the merchant knowing the identity, address, electronic mail address, credit information and/or other personal information of the customer.

The present invention is directed to the information system for storing personal information of the customer. The customer preferably communicates with the information system using the Internet. Further, the customer preferably uses the anonymous identifier to gain access to the information system. The customer can create the anonymous identifier to assure anonymity and to facilitate anonymous and secure transactions over the Internet.

Some or all of the personal information of the customer is preferably electronically shredded and defaced before storage in the information system. This feature allows the customer to maintain private data in the information system anonymously and shields the private data from even the operators of the information system.

In addition to maintaining the private data, the information system allows the customer to anonymously receive an estimate on a service and/or receive a service from the service merchant without the merchant knowing the identity of the customer. Examples of quotes and/or services that may be received from service merchants include an insurance quote for a vehicle, an insurance quote for a structure, a life insurance quote, a health insurance quote, an insurance quote on some other item, a one time use of special software such as tax computation software, a quote on a loan, interest rates for a loan application, and clothing that is custom tailored.

In summary, the present invention allows the customer to keep private data anonymously on the internet and use that data to engage in service transactions with service merchants on the global computer network without the service merchant receiving private information of the customer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 3A–3C are block diagrams that illustrate databases having features of the present invention;

FIGS. 7A–7F are simplified illustrations for data shredding and data defacing for protecting the privacy of data;

FIGS. 8A and 8B are simplified examples of web pages that can be generated by the service merchant;

FIGS. 9A–9C are simplified examples of web pages that can be generated by the information system;

FIGS. 9D–9E are simplified examples of web pages that can be generated by the information system in response to a service request by a customer from a service merchant web page.

DESCRIPTION

Introduction

Figure 1:
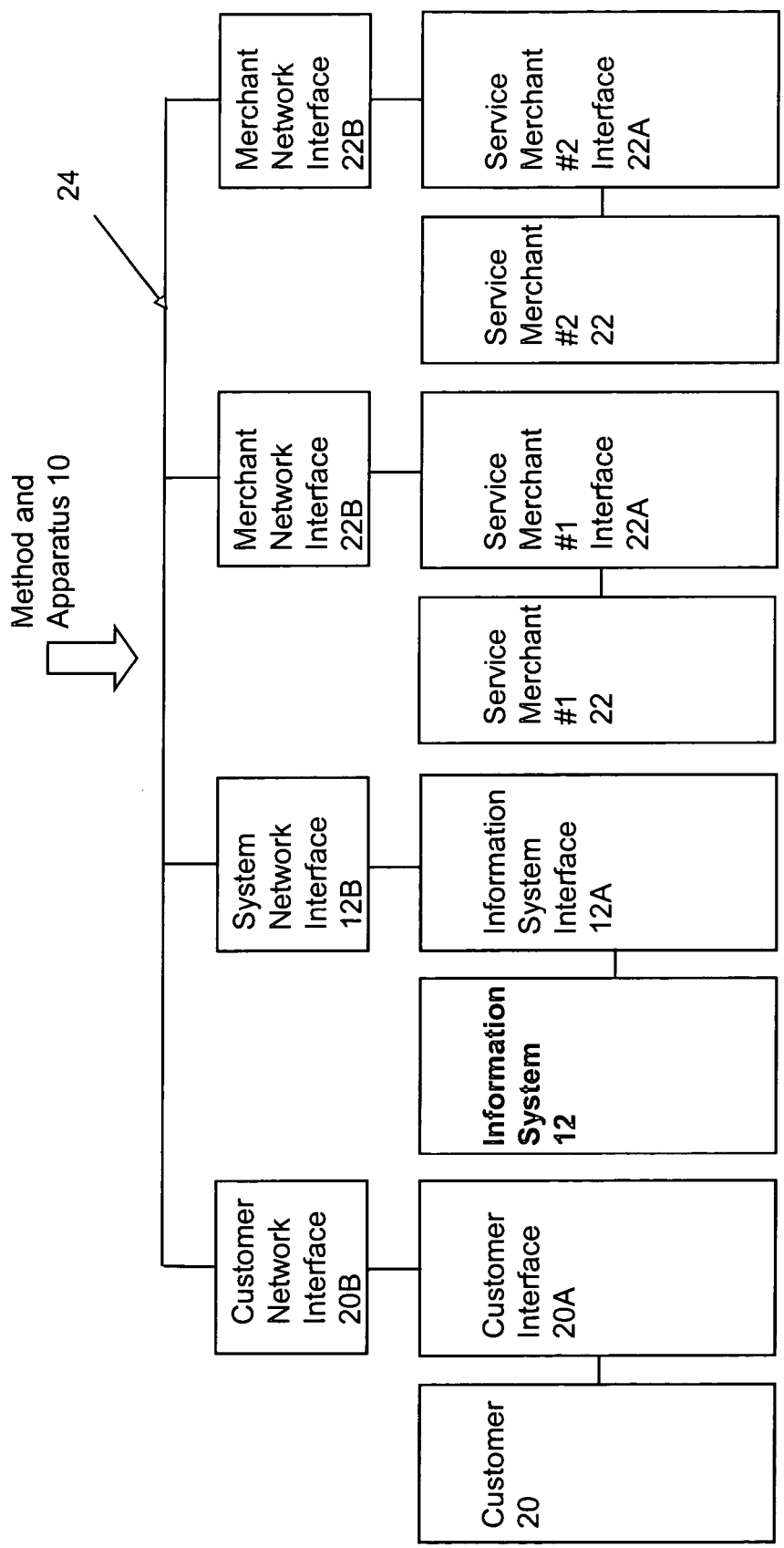
FIG. 1 is a block diagram that illustrates an apparatus and method having features of the present invention.

Referring initially to FIG. 1, a method and apparatus 10 having features of the present invention can include an information system 12, an information system interface 12A, at least one customer interface 20A for a customer 20, at least one or more merchant interfaces 22A (two are illustrated) for a service merchant 22 that are preferably connected on a global computer network 24. As provided herein, the present invention facilitates (i) anonymous information storage and (ii) anonymous service transactions between the customer 20 and the service merchants 22 on the globally connected network.

As an overview, the present invention allows the customer 20 to maintain private data 25 (illustrated in FIG. 2) in the information system 12 anonymously. The private data 25 is preferably accessible only to the customer 20 with an anonymous identifier 320 (illustrated in FIGS. 2, 3A and 4) and is preferably shielded from even the operators (not shown) of the information system 12.

In addition to maintaining the private data 25, the information system 12 allows the customer 20 to anonymously receive an estimate on a service and/or receive a service 806 (illustrated in FIG. 8A) from the service merchant 22 without the merchant 22 knowing the identity of the customer 20. Examples of quotes and/or services 806 that may be received from service merchants 22 include an insurance quote for a vehicle, an insurance quote for a structure, a life insurance quote, a health insurance quote, an insurance quote on some other item, a one time use of special software such as tax computation software, a quote on a loan, interest rates for a loan application, and clothing that is custom tailored.

Stated another way, the information system 12 allows the customer 20 to receive a quote on a service, purchase and/or receive a service from the merchant 22 without disclosing any information that will specifically identify the customer 20 to the merchant 22. Further, the information system 12 allows the service results to be received by the customer 20 without the merchant 22 having access on how to directly contact the customer 20. As a result thereof, the information system 12 minimizes the number of people, businesses and institutions that have access to both the private information of the customer 20 and the identity of the customer 20. This minimizes the opportunity for the information of the customer 20 to be improperly disseminated.

Preferred and optional aspects of the method and apparatus 10 are described below. The headings are provided for the convenience of the reader.

Information System 12

Figure 2:
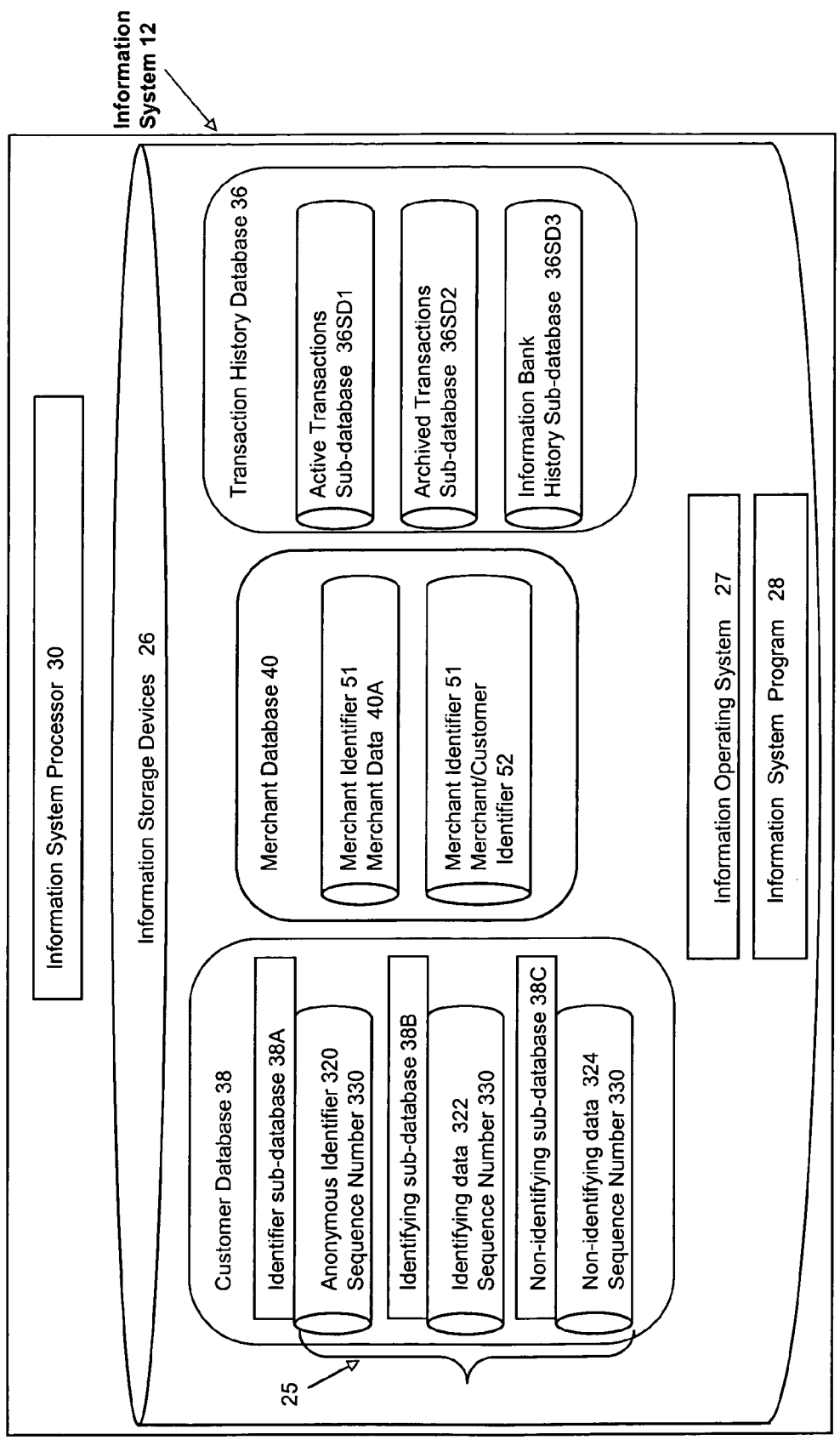
FIG. 2 is a block diagram that illustrates an information system having features of the present invention.

Referring to FIG. 2, the information system 12 includes (i) an information storage device 26, (ii) an information operating system 27 stored in the information storage device 26, (iii) an information system program 28 stored in the information storage device 26, (iv) and an information system processor 30 connected to the information storage device 26. The information system processor 30 can include one or more conventional CPU's. The information system processor 30 is preferably capable of high volume processing and database searches.

The information storage device 26 can include one or more magnetic disk drives, magnetic tape drives, optical storage units, CD-ROM drives and/or flash memory. The information storage device 26 also contains a plurality of separate storage devices and a plurality of databases used in the processing of transactions. For example, as illustrated in FIG. 2, the information storage device 26 can include a transaction history database 36, a merchant database 40, and a customer database 38.

Referring back to FIG. 1, the information system 12 includes a system network interface 12B that allows the information system 12 to communicate with the customer 20, and the merchant 22. Conventional internal or external modems may serve as the system network interface 12B. In a preferred embodiment, the system network interface 12B is connected to the merchant interface 22A, the customer interface 20A on the global network 24. Alternately, the system network interface 12B can be connected by an electronic, a voice and/or a traditional communication system that allow the information system 12 to interact with the merchant interface 22A, the customer interface 20A. For example, the information system 12 can be connected to the merchant interface 22A and the customer interface 20A with one or more phone lines.

Preferably, the information system interface 12A can include an input device (not shown), such as a keyboard, mouse or voice recognition software and a display that allows access to the information system 12.

The customer network interface 20B allows the customer 20 to communicate with the information system 12 and the merchant 22. Conventional internal or external modems may serve as the customer network interface 20B. In a preferred embodiment, the customer network interface 20B is connected to the merchant interface 22A and the information system interface 12A on the global network 24. Alternately, the customer network interface 20B can be connected by other electronic, voice and/or traditional communication systems that allow the customer 20 to interact with the merchant interface 22A and the information system interface 12A.

Preferably, the customer interface 20A can include an input device, such as a keyboard, mouse or voice recognition software and a display that allows the customer 20 to interact with the customer network interface 20B.

The merchant network interface 22B allows the merchant 22 to communicate with the information system 12. Conventional internal or external modems may serve as the merchant network interface 22B. In a preferred embodiment, the merchant network interface 22B is connected to the customer interface 20A and the information system interface 12A on the global network 24. Alternately, the merchant network interface 22B can be connected by other electronic, voice and/or traditional communication systems that allow the merchant 22 to interact with the information system interface 12A.

Preferably, the merchant system interface 22A can include an input device, such as a keyboard, mouse or voice recognition software and a display that allows access to the information system 12.

Transaction History Database 36

Referring to FIG. 2, the transaction history database 36 maintains data on all of the information that flows from each transaction that is performed using the information system 12. This data may be segregated and maintained in an active transactions sub-database 36SD1, an archived transactions database 36SD2 and an information bank history sub-database 36SD3. The information in the active transaction sub-database 36SD1 can include a copy of all data records exchanged between (i) the information system 12 and (ii) the merchant 22, and the customer 20 related to the particular transaction. Information in the archived transaction history sub-database 36SD2 includes the same data as for active transactions sub-database 36SD1 for those transactions that are completed. The information in the History sub-database 36SD3 may include data used for the operation and maintenance of the information system.

Merchant Database 40

The merchant database 40 maintains data on all of the merchants 22 that interact with the information system 12. The merchant database 40 can store (i) a merchant identifier 51 and (ii) the merchant data 40A, e.g. the name, address, phone, facsimile, web page, and/or electronic mail address of the merchant together in one sub-database. Additionally, the merchant database 40 can store the merchant identifier 51 and a merchant/customer identifier 52 (described below under the heading Data storage/retrieval operation).

Customer Database 38

With reference to FIG. 2, the customer database 38 contains private data 25 specifically related to the customer 20. The private data 25 related to the customer 20 is preferably separated and stored in at least three separate sub-databases, namely, (i) an identifier sub-database 38A, (ii) identifying sub-database 38B, and (iii) non-identifying sub-database 38C of each customer 20. Each sub-database is explained below.

Identifier Database 38A

Referring to FIGS. 2 and 3A, the information system 12 preferably stores the anonymous identifier 320 of each of the customers 20 in the identifier database 38A. As provided herein the anonymous identifier 320 is used to both anonymously identify and verify the customer 20 for gaining access to and interacting with the information system 12. The anonymous identifier 320 enables the customer 20 to interact with and use the information system 12 without revealing their personal identity. Stated another way, the anonymous identifier 320 enables the customer 20 to be anonymously identified to the information system 12.

The anonymous identifier 320 can be any number of characters that can be used to anonymous identify and verify the customer 20 for gaining access to and interacting with the information system 12. The anonymous identifier 320 is preferably self-created by the user 20. More specifically, the user 20 decides upon the exact characters that make up the anonymous identifier 320 without the aid or authority of any business or government entity. However, as provided herein, the information system 12 preferably provides a guideline for the format of the anonymous identifier 320. The details of the anonymous identifier 320 are explained in more detail below.

The information system 12 preferably assigns and associates a unique sequence number 330 for each anonymous identifier 320. The sequence number 330 can include any number of characters. The sequence number 330 is subsequently used as a reference to save and retrieve the private data 25 of the customer 20 in the identifying database 38B and non-identifying database 38C. The sequence number 330 is also preferably stored with the anonymous identifier 320 in the identifier database 38A.

Upon the entry of the anonymous identifier 320 by the customer 20 via the customer interface 20A, the information system program 28 operates with the information system processor 30 to review the identifier database 38A to check for the existence of the anonymous identifier 320. Upon the location of an existing anonymous identifier 320, the information system 12 allows the customer 20 to have access to the private data 25 that is tied to the anonymous identifier 320. The identifier database 38A is also used to store the new anonymous identifier 320 for each new customer 20 that creates a new anonymous identifier 320.

Identifying Database 38B

Referring to FIG. 3B, the information system 12 preferably stores any identifying data 322 of the customer 20 in the identifying database 38B of the storage device 26. Identifying data 322, as used herein, shall mean any information or data of the customer 20 that if used independently is sufficient to identify the customer 20 to a third party. Examples of identifying data 322 include, a name, an address, a telephone number, a facsimile number, an e-mail address, a social security number, a credit card number, and/or a driver license number of the customer 20. Identifying data 322 may also include other data that can indirectly, independently identify the customer 20, such as a license plate number for a vehicle registered by the customer, or an alias.

The identifying data 322 is preferably kept in the identifying database 38B in a manner that safeguards the privacy of the identifying data 322 in the storage device. Many approaches may be used to safeguard the privacy of identifying data 322. For example, access to the identifying data database 38B can be controlled by a password (not shown).

The present invention discloses another method that may be used in conjunction with and/or separately from any other methods to make the identifying data 322 stored in the identifying database 38B more secure. This method is described later.

The identifying data 322 is preferably linked with the sequence number 330 in the identifying database 38B.

Data Types Within the Identifying Data

As provided herein, referring to FIG. 3B, the information system 12 references and/or categorizes the identifying data 322 into a number of different Id types 350A–D. For example, the identifying data 322 may be referenced by a number of Id types 350A–D including data-name 350A, data-address 350B, data-email 350C, and data-telephone 350D. Data-name 350A refers to and includes the name of the customer 20. Data-address 350B refers to the address of the customer 20. Data-email 350C refers to the email address of the customer 20. Data-telephone 350D refers to the telephone number of the customer 20. The different Id types 350A–D facilitate easy storage and retrieval of the identifying data 322 in the information system 12.

Non-Identifying Database 38C

Referring to FIGS. 2 and 3C, the information system 12 preferably stores any non-identifying data 324 of the customer 20 in the non-identifying data database 38C. Non-identifying data 324, shall mean and include, any information or data of the customer 20 that if used independently is not sufficient to identify the customer 20 to a third party. Non-identifying data 324 can be any information or data of the customer 20 in which the identifying data 322 has been removed. As provided herein, the dissemination of the non-identifying data 324 to third parties will typically not harm or influence the customer 20 without the use in conjunction with any identifying data 322.

Examples of non-identifying data 324 can include (i) custom tailor information 302 such as the sex, height, weight, and body dimensions of the customer 20 to support custom tailoring and/or clothing rental, (ii) tax related information 304 such as income, deductions and other data that will support the preparation of a tax related document, (iii) loan application data 306 such as income, debts, obligations, assets and credit rating that will support the preparation of a loan application, (iv), medical records 308 such the medical history, visit dates, diagnosis, and treatment that will support a medical insurance application and/or diagnosis of an ailment (v) motor vehicle records 310 such as the type of car, age, miles driven, zip code, storage information to support a vehicle insurance quote, and (vi) financial records 312 such as bank records, bank accounts and loan accounts that will support a loan application.

As discussed above, the non-identifying data 324 is preferably stored by the information system 12 in the non-identifying database 38C. Further, the information system 12 preferably anchors and saves the non-identifying data 324 of a customer 20 with the sequence number 330 of the customer 20. With this design, the sequence number 330 can be used to access and locate the non-identifying data 324 from the non-identifying database 38C.

Data Types Within Non-Identifying Data

As provided herein, the information system 12 references and/or categorizes the non-identifying data 324 by a number of different NI types 360A–D. For example, the non-identifying data 324 may be referenced by a number of NI types 360A–D including data-body 360A, data-health 360B, data-finance 360C, and data-insurance 360D. Data-body 360A refers to and includes information relating to the body dimensions of the customer. Data-health 360B refers to and includes information relating to the health of the customer, including medical records. Data-finance 360C refers to and includes information relating to the finances of the customer, including, for example, tax records. Data-insurance 360D refers and includes information relating to what is needed to apply for an insurance quote. The different NI types 360A–D facilitate easy storage and retrieval of the non-identifying data 324 in the information system 12.

Anonymous Identifier

Figure 4:
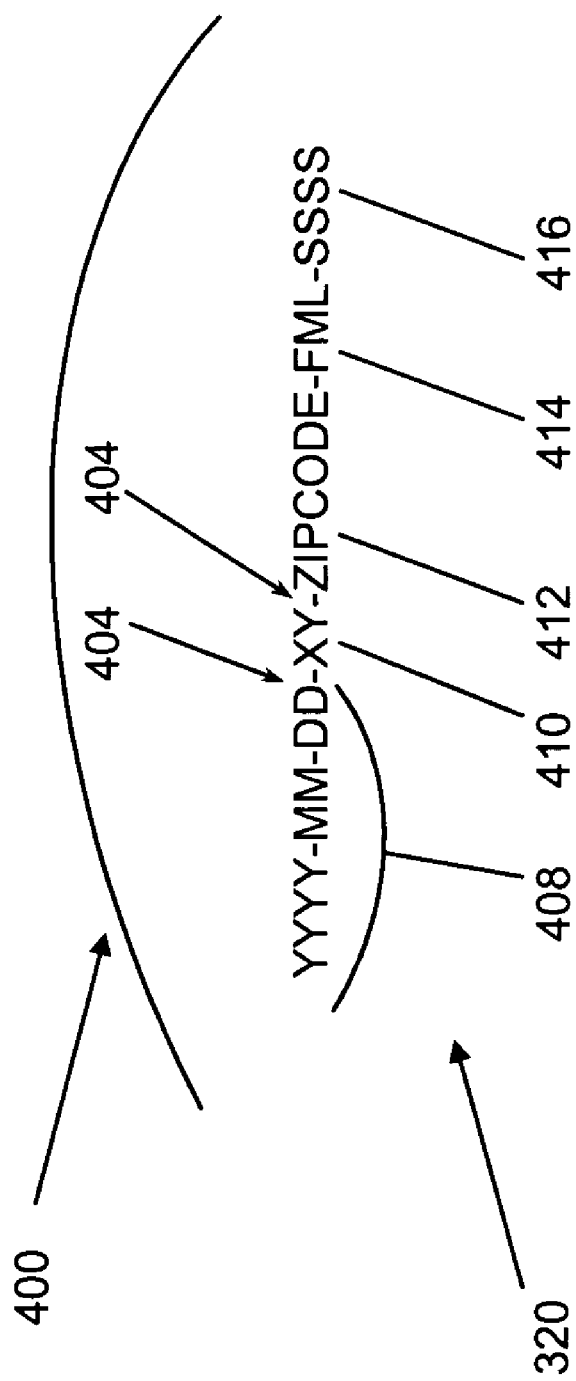
FIG. 4 illustrates an anonymous identifier having features of the present invention.

FIG. 4 illustrates a preferred anonymous identifier 320 according to the present invention. The anonymous identifier 320 illustrated in FIG. 4 utilizes a single data string 400 that is solely used to verify the user 20 to the information system 12. Because there is no public identification step, the identity of the user 20 can be maintained within the information system 12 without formally and publicly identifying the user 20 to the information system 12. Further, the customer 20 can access the information system 12 without personally identifying themselves to the information system 12.

Preferably, the anonymous identifier 320 includes one or more elements 408, 410, 412, 414, 416 that are separated by a delimiter 404. The elements 408–416 make it easy for the user 20 to create, use and remember the anonymous identifier 320. Each of the elements 408–416 preferably includes one or more easy to remember characters.

As provided herein, a first element 408 can include the sub-elements of a calendar date. A second element 410 may be a class code of the user 20. A third element 412 may be in the form of a location code of the user 20. A fourth element 414 may be a name abbreviation of the user 20. A fifth element 416 can be a sequence code.

The calendar date 408 can be any date selected by the user 20. The calendar date 408 may be a date in the future or a date in the past. Preferably, the calendar date is personal to the user 20 and easy to remember. For example, the calendar date 408 may be the date of birth of the user 20. The calendar date 408, preferably, is in the format of an eight character code of YYYY-MM-DD. The month may also be a three letter representation of the month. The year may also be a four letter representation of the animal that is used to represent a year in a Chinese calendar.

The class code 410 is a string of characters that is selected by the user 20 because the user 20 has an affinity for these characters and/or these characters are easy to remember. The class code 410, for example, may be a two letter code selected by the user 20. Alternately, the class code 410 can be a one letter code representing the gender of the person. Still alternatively, the class code 410 may be any letter with which the user 20 can easily associate with and remember. For example, the class code 410 may include the single letter "H" for Happy, "G" for Good, "F" for Friendly, "B" for blood group, or "Y" for Yellow as a favorite color. Yet alternatively, the class code 410 may be a personal phrase that fits within a defined length such as "my dog buffy".

The location code 412 can be any code selected by the person. Preferably, the location code 412 is the zip code of the address of the user 20. For example, the location code 412 can be a five digit numeric code as a zip code used in the United States. Alternately, the location code 412 may also be an alphanumeric code as used in some other countries.

The personal abbreviation 414 is selected by the user 20. Preferably, the personal abbreviation 414 is a three letter code that is defined by the initials of the user 20. For example, if the user's name is John P. Smith, then the personal abbreviation 414 is "JPS". Alternatively, the personal abbreviation may be a combination of any three letters in which the user has an affinity for and thus would easily remember.

The calendar date 408, the class code 410, the location code 412, and personal abbreviation 414 are preferably arranged in a specific order. For example, the specific order can be the calendar date 408, the class code 410, the location code 412 and the personal abbreviation 414. This arrangement is preferred because people typically think of their birth date as being closest to them; then they may think what kind or class of person they are and where they are from and what they are called.

As provided above, the adjacent elements 408–414 can be separated by a plurality of delimiters 404. The delimiters 404 highlight and distinguish the different elements. Suitable delimiters include a dash, comma, slash, colon, etc.

Based on the range of possibilities of the elements 408–414 of the anonymous identifier 320, a very large number of anonymous identifiers 320 are possible. As an illustration, for the embodiment provided herein, the range of possibilities are: 9999 times for four digits of YYYY, 12 times for two digits MM of the month, 30 times for two digits DD of the day, 99,999 times for five digits of the numeric zip code, 26 times for one digit of the class code, and 26×26×26 times for three letters of a personal abbreviation. This equals a very, very large number greater than 1000 trillion. Therefore, the probability of two persons creating the same anonymous identifier 320 is believed to be less than 1/100 trillion.

In order to make it even less likely that two or more users 20 create the same anonymous identifier 320, the anonymous identifier 320 may also include the sequence code 416. The sequence code 416, for example, may be a four digit, character sequence that is appended after the personal abbreviation 414. The user 20 may choose any sequence code 416 that is easy to remember. For example, the sequence code 416 may be last four digits of the social security number, the last four digits of a telephone number, or any number that the user 20 can easily remember.

Any combination of one or more of the elements 408–416 as described above may be used as an anonymous identifier 320. The anonymous identifier 320 is preferably self-created by the user 20 the first time the user 20 interacts with the information system 12. After the anonymous identifier 320 is created, it is preferably stored in the identifier database 38A by the information system 12. Subsequently the anonymous identifier 320 is used to verify the user 20 to the information system 12 so that the user has access to the private data 25 of the user in the information system 12.

Data Shredding/Defacing

As discussed above, the anonymous identifier 320 and the private data 25 of the user 20 is stored in the information storage device 26. The anonymous identifier 320 is saved in the identifier database 38A with the sequence number 330 that is assigned to every anonymous identifier 320. The private data 25 of the user 20 is preferably divided into the identifying data 322 and the non-identifying data 324. The identifying data 322 is stored in the identifying database 38B along with the sequence number 330. The identifying data 322 is preferably electronically shredded and defaced as provided below to protect the identifying data 322. The non-identifying data 324 is stored separately in the non-identifying database 38C also along with the sequence number 330. The non-identifying data 324 is in a form that does not identify the owner of that data. Thus, it is typically only necessary to protect the dissemination of the non-identifying data 324.

Figure 7A:
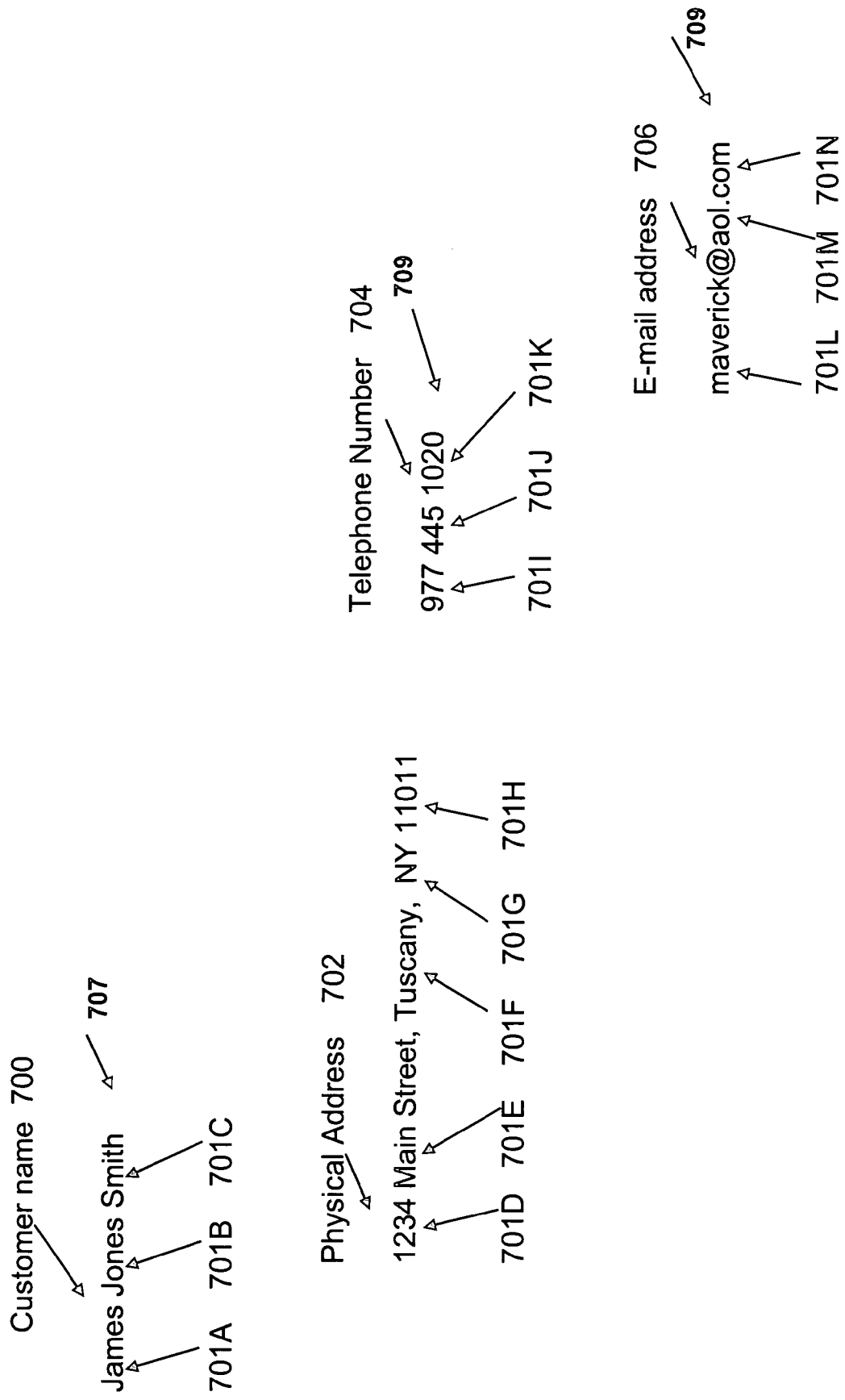

As an overview, the information system 12 initially electronically divides e.g. shreds, the identifying data 322 into a plurality of smaller data shreds 701A–N (illustrated in FIG. 7A). Subsequently, the data shreds 701A–N are electronically altered, e.g. defaced, to create a plurality of defaced parts 705A–N (illustrated in FIGS. 7B, 7C, 7E, and 7F). Next, the defaced parts 705A–N are stored in the identifying data database 38B. The defaced parts 705A–N are anchored and saved with the sequence number 330. Subsequently, the defaced parts 705A–N can be reconstructed by the information system 12 upon request by the customer 20 using their anonymous identifier 320. With this system, the identifying data 322 stored in the identifying database 38B is private even from the operators of the information system 12 who may have internal access to the information in the information system 12.

As provided herein, a black box program 58 (illustrated in FIG. 5) that is part of the information system program 28 and is operative with the information system processor 30 is utilized to perform the data shredding and data defacing. FIGS. 5, 6A–C and 7A–F, illustrate how the identifying data 322 of the user 20 may be stored and accessed in the Information system 12 using the black box program 58. A more complete discussion is provided below.

Data Shredding

With reference to FIG. 7A, the identifying data 322 is first divided, broken in or shredded into a plurality of smaller data shreds 701A–701N by the information system 12. The FIG. 7A illustrates the shredding and/or breaking down of the identifying data 322 into 18 separate data shreds, namely data shreds 701A–701N.

Data Defacing

Subsequently, the data shreds 701A–701N are electronically defaced to create the plurality of defaced parts 705A–N using the black box program 58 in conjunction with the system processor 30. Preferably, the defacing is in a manner that preserves the format of the data shreds 701A–701N. For example, if the particular data shred 701A–701N is made of numbers, it is defaced into a defaced part 705A–N that is made of numbers. Similarly, if the particular data shred 701A–701N is made of letters from the alphabet, it is preferably defaced into a defaced part 705A–N that is made of letters of the alphabet. If the particular data shred 701A–701N is made of a combination of letters and numbers, the defaced part 705A–N preferably includes a similar combination of letters and numbers.

Preferably, the character and format of the respective data shred 701A–701N and the respective defaced part 705A–705N are such that a third party would not be able to select which one is the data shred 701A–701N and which one is the defaced part 705A–705N. It is believed that with prior art encoding, the encoded data appears differently than the original data. Thus, a person intent on breaking the code may use extraordinary amount of computing resources and may be able to eventually break the encoding to discover the original data. This is less likely with the preferred way of defacing described herein, because the person who may try to break the defacing code is not able to distinguish what is original and what is defaced. In other words, the person is not able to distinguish the defaced part 705A–705N created by the information system 12 from the original data shred 701A–701N.

For example, as provided herein, if the original data shred 701A–701N has the character of a name, hereinafter referred to as "Name-character data" 707, the defaced part 705A–705N also has the character of a name. If the original data shred 701A–701N has the character of a number or is alphanumeric, herein after referred to as "Non-name character data" 709, the defaced part 705A–705N also has the character of number or alphanumeric.

Name-character data 707 is primarily made up of letters of the alphabet. Examples of the Name-character data 707 include (i) the customer name 700 e.g. the first name, middle name and last name of the customer 20, and (ii) the physical address 702, e.g. the street name, city name, and state name of the customer 20. The Non-name character data 709 is primarily made up of numbers. Examples of the Non-name character data 709 include the telephone number 704, street number, or an alphanumeric string for e-mail address 706 of the customer 20.

As provided herein, the method of defacing the data shreds 701A–701N depends upon whether the data shred 701A–701N is Name-character data 707 or Non-name character data 709.

Defacing of Non-name Character Data

As an overview, the black box program 58 is operative with the system processor 30 to generate a defacing code 711 that includes a separate random number 713 for each digit of the data shred 701A–701N. Subsequently, the information system 12 uses the respective random number 713 to forward or reverse the particular digit in the data shred 701A–701N within the domain of the digit. If the digit is a number, the domain is from 0 to 9. If the digit is a letter in the alphabet, the domain is A to Z. The process is repeated for each digit of data in the data shred by the information system 12.

The following example illustrates the defacing of a piece of Non-name character data, namely, "91D". The "91D" data shred includes three digits of data. Initially, the information system 12 generates a random number 713 for each digit of data in the data shred 701A–701N. For example, the information system 12 could generate a "3" for the first random number. As a result thereof, the information system can move the first digit "9" forward by "3" to yield "2".

Subsequently, the information system 12 generates a second random number. For example, the information system could generate a "5" for the second random number. As a result thereof, the information system 12 moves the second digit "1" forward by "5" to yield "6".

Next, the information system 12 generates a third random number. For example, the information system 12 could generate a "2" for the third random number. As a result thereof, the information system 12 moves the third digit "D" forward by "2" to yield "F".

In this simplified illustration, the non-name character shred data 709 is "91 D", the corresponding defaced part 705A–N is "26F" and the defacing code 711 is "352". Alternatively, the digits can be reversed in their domain using the defacing code 711 "352" or information system 12 may use any combination of forwarding or reversing with the defacing code 711. The black box program 58 is operative with the system processor 30 to hide the logic concerning the forwarded or reversing of the digits.

The steps involved in defacing a data shred 701A–N of Non-name character data 709 are illustrated in FIG. 7B. At step 780 the sequence number 330 is input to the black box program 58 by the information system 12. At step 782 the original data shred 701A–N having 3 digits of data, for example, is input by the consumer 20 using the consumer interface 20A into the information system 12. At step 784 the information system 12 creates a defacing code 711 by picking random numbers 713, e.g. a first random number, a second random number, and a third random number. At step 786 the information system 12 defaces the respective data shred 701A–N by offsetting (i) the first digit of the respective data shred 701A–N by the first random number, (ii) the second digit of the respective data shred 701A–N by the second random number, and (iii) the third digit of the respective data shred 701A–N by the third random number. At step 788 the information system 12 saves the respective defaced part 705A–N and the corresponding defacing code 711 in the identifying database 38B referenced by the sequence number 330.

Figure 5:
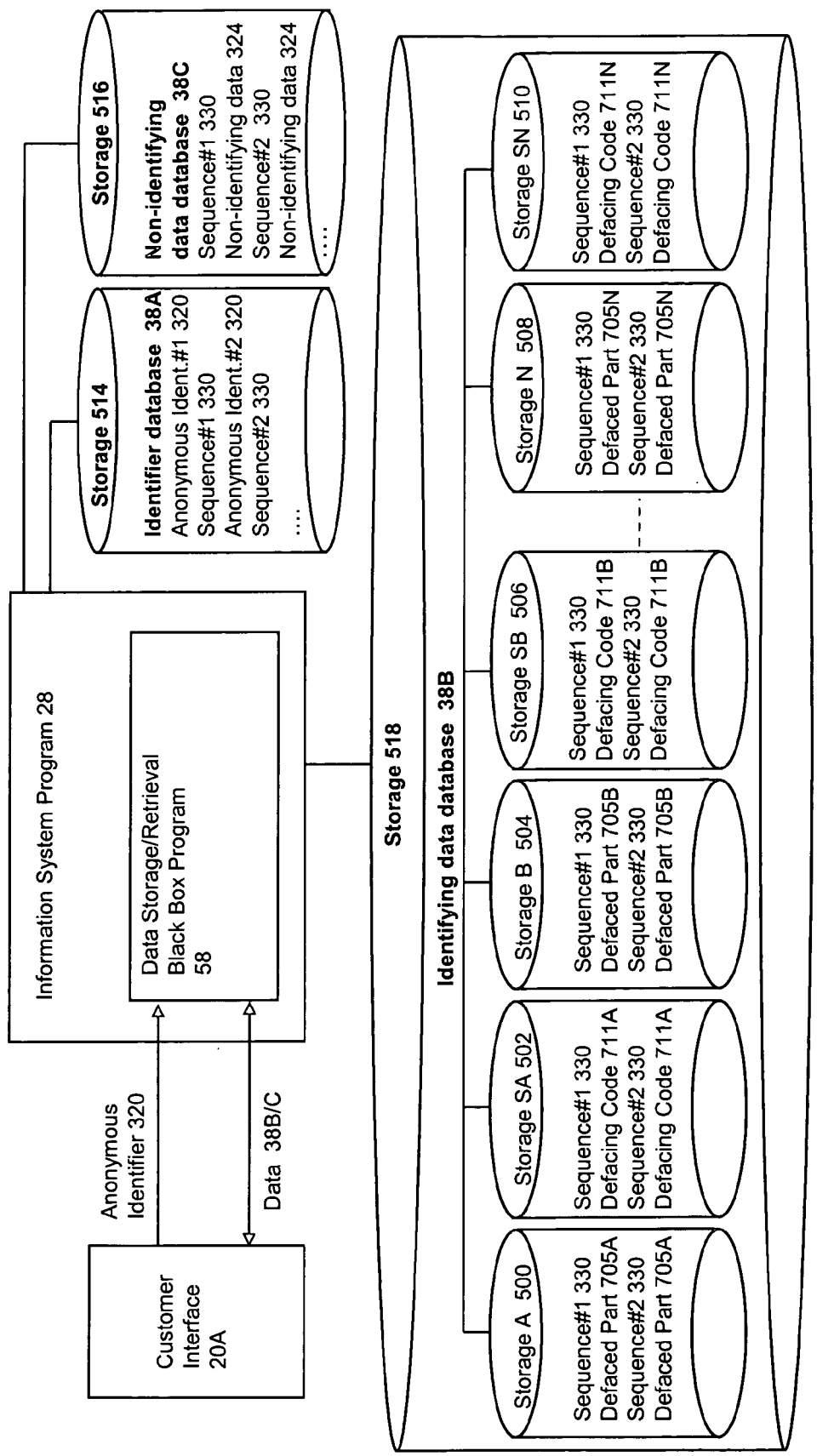
FIG. 5 is a block diagram that illustrates some of the functions of the information system having features of the present invention.

The information system 12 can save the defaced part 705A–N and the corresponding defacing code 711 in separate data storage devices as illustrated in FIG. 5, where storage A 500 is used for defaced part 705A and storage SA 502 is used for the corresponding defacing code 711A. At step 790 the information system 12 repeats steps 780–788 for each respective data shred 701A–N of the non-name character data parts 709.

The steps involved in un-defacing a Non-name character data shred 709 are illustrated in FIG. 7C. At step 792 the information system 12 inputs the sequence number 330 into the black box program 58. At step 794 the information system 12 uses the sequence number 330 to read the respective defaced part 705A–N from the database 38B. At step 796 the information system 12 uses the sequence number 330 to read the respective defacing code 711 from the database 38B. The respective defaced part 705A–N and the respective defacing code 711 may have been saved in physically separate data storage device as illustrated in FIG. 5. At step 797 the information system 12 un-defaces the respective defaced part 705A–795N using the respective defacing code 711 to get the original data shred 701A–N. The un-defacing reverses the steps of defacing as described above. At step 798 the information system 12 repeats steps 792–797 for each respective defaced part 705A–N of other non-name character data parts 709.

Defacing Name-Character Data 707

As an overview, referring to FIG. 7D, the information system 12 maintains a name character data lists in the storage device 26 for each unique piece of Name character data 707. A simplified illustration of such lists is shown, where a First name Data shred 710, a Middle Name Data shred 712, a Last name List Data shred 714, Street name List Data shred 716, a City name List Data shred 718, a State Name List Data shred 720, and an ISP name List Data shred 722 are shown.

A Name character data part position on the list is found by scanning the list for the name data shred. That position number on the list is altered with the help of the randomly generated defacing code 711 to yield a new position called the privacy position on the list. That privacy position is then used to look up the privacy name from the list. This privacy name along with the defacing code 711 is saved as the defaced Name character data part in the database 38B.

As a simplified illustration, the name character data part is James, the first name. From the First name list 710 the list position of James is found as 1. For this example, the black box program 58 generates a first random number of 2. The list position "1" is forwarded by "2" to yield a privacy list position "3". The privacy list position 3 is used to find the privacy name "Mike" from the list. The privacy name "Mike" and the defacing code "2" are saved in the database 38B using the sequence number 330. There may be any number of random numbers and forwarding and or reversing steps to determine the privacy name. These are hidden in the black box program 58.

As yet another simplified illustration, the name character data part is Nebraska, the state name. From the State name list 720 the list position of Nebraska is found as 2. Suppose the black box program 58 generates a first random number of 50. The list position 2 is forwarded by 50 to yield a privacy list position 52. The privacy list position 52 is used to find the privacy name "Washington" from the list 720. The privacy name "Washington" and the defacing code "50" are saved in the database 38B using the sequence number 330. There may be any number of random numbers and forwarding and or reversing steps to determine the privacy name. These are hidden in the black box program 58.

FIG. 7E illustrates the steps involved in defacing a Name character data part 707. At step 740 the information system 12 obtains the sequence number 330 from the identifier database 38A and inputs the sequence number 330 into the black box program 58. At step 742 the information system 12 retrieves the data shred 701A–701N of name character data part 707 and inputs the name character data part 707 into the black box program 58. At step 744 the information system 12 scans the name character data part list to find the list position. If the name character data part 707 is not in the list, the information system 12 adds the name character data part 707 to the list. At step 746 the information system 12 creates the defacing code 711 by finding one or more random numbers. At step 748 the information system 12 computes the privacy list position from the list position by modifying the list position by the defacing code 711. At step 750 the information system 12 uses the privacy list position to read the privacy name from the list 720. At step 752 the information system 12 saves the privacy name and the defacing code 711 in database 38B using the sequence number 330. The information system 12 may save the defaced parts 705A–N and the corresponding defacing codes 711 in separate data storage devices as illustrated in FIG. 5, where storage A 500 is used for defaced part 705A and storage SA 502 is used for the corresponding defacing code 711A. At step 754 the information system 12 can repeat steps 740–752 for the other name data parts 707.

The steps involved in un-defacing a Name character data part 707 are illustrated in FIG. 7F. At step 760 the information system 12 accesses the sequence number 330 from the storage device 26 and inputs the sequence number 330 into the black box program 58. At step 762 the information system 12 uses the sequence number 330 to read the privacy name from database 38B. At step 764 the information system 12 scans the name data parts lists 730 to find the privacy list position. At step 766 the information system 12 uses the sequence number 330 to read the corresponding defacing code 711. The information system 12 may have saved the defaced part 705 and the defacing code 711 in physically separate data storage devices as illustrated in FIG. 5. At step 768 the information system 12 finds the original list position. The privacy list position is un-defaced to find the original list position. At step 770 the information system 12 uses the original list position to find the original name. At step 772 the information system 12 can repeat steps 760–770 for other name character data parts.

Data Storage/Retrieval

The information system 12 stores the defaced parts 705A–N in the identifying data database 38B. The information system 12 anchors and saves the defaced parts 705A–N with the sequence number 330. Referring to FIG. 5, each defaced part 705A–N and its associated defacing code 711A–N is saved separately in separate databases that may be in physically separate storage devices. Storage of each defaced part 705A–N and its associated defacing code 711A–N are anchored by the sequence number 330 corresponding to the anonymous identifier 320. For example, the simplified illustration shows, a storage device A 500 for storing defaced part 705A, a storage device SA 502 for storing the defacing code 711A that corresponds to the defaced part 705A, a storage device B 504 for storing defaced part 705B, a storage device SB 506 for storing the defacing code 711B that corresponds to the defaced part 705B, a storage device N 508 for storing defaced part 705N, a storage device SN 510 for storing the defacing code 711N that corresponds to the defaced part 705 N. This pattern continues in a similar fashion for each of the 18 defaced parts 705A–705N. Thus, in this example, the defaced parts 705A–N and the corresponding defaced codes 711A–N are stored in thirty-six separate storage devices and/or databases.

The defaced parts 705A–N can be reconstructed by the information system 12 upon request by the customer 20 using the anonymous identifier 320 of the customer 20. More specifically, the customer 20 contacts the information system 12 via the customer interface 20A. The customer 20 provides their anonymous identifier 320 and requests access to the data.

A black box program 58 is operative with information system processor 30 to shred the data into the data shreds 701A–N, deface the data shreds 701A–N to create the defaced parts 705A–N and reconstruct the defaced parts 705A–N to obtain the data shreds 701A–N and reassembly the data shreds 701A–N to get the original data. The program 58 interfaces to at least three storage devices 514, 518 and 516 for the purpose of accessing the anonymous identifier 38A, the identifying data 38B and the non-identifying data 38C from these storage devices respectively.

With this system, the identifying data 322 stored in the identifying database 38B is private even from the operators of the information system 12 who have internal access to the information system 12.

The customer 20 via the customer interface 20A interfaces with program 58 by providing the anonymous identifier 320. In response thereto, the customer 20 can send data to the information system 12 or request review of data from the information system 12.

Data Storage/Retrieval Operation

Figure 6A:
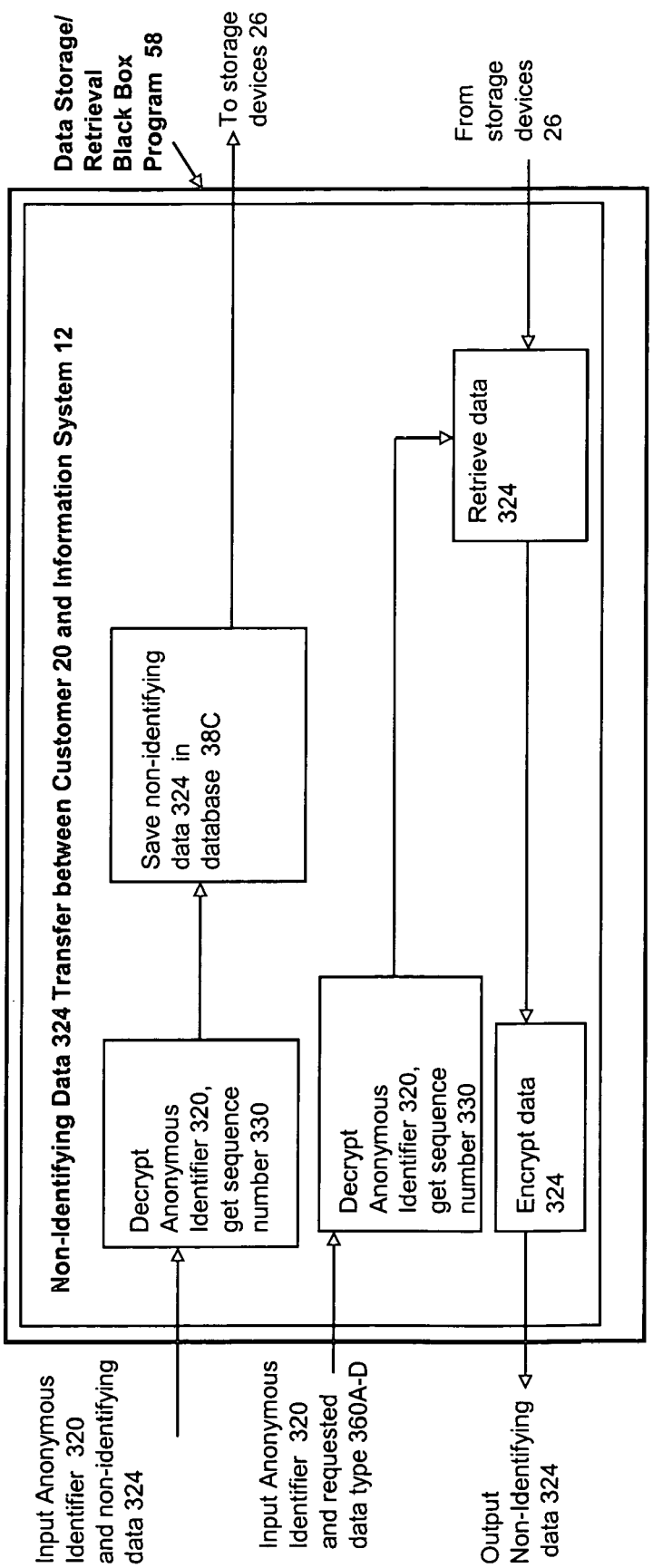
FIGS. 6A–C are block diagrams that illustrate some of the functions of the information system having features of the present invention.
Figure 6B:
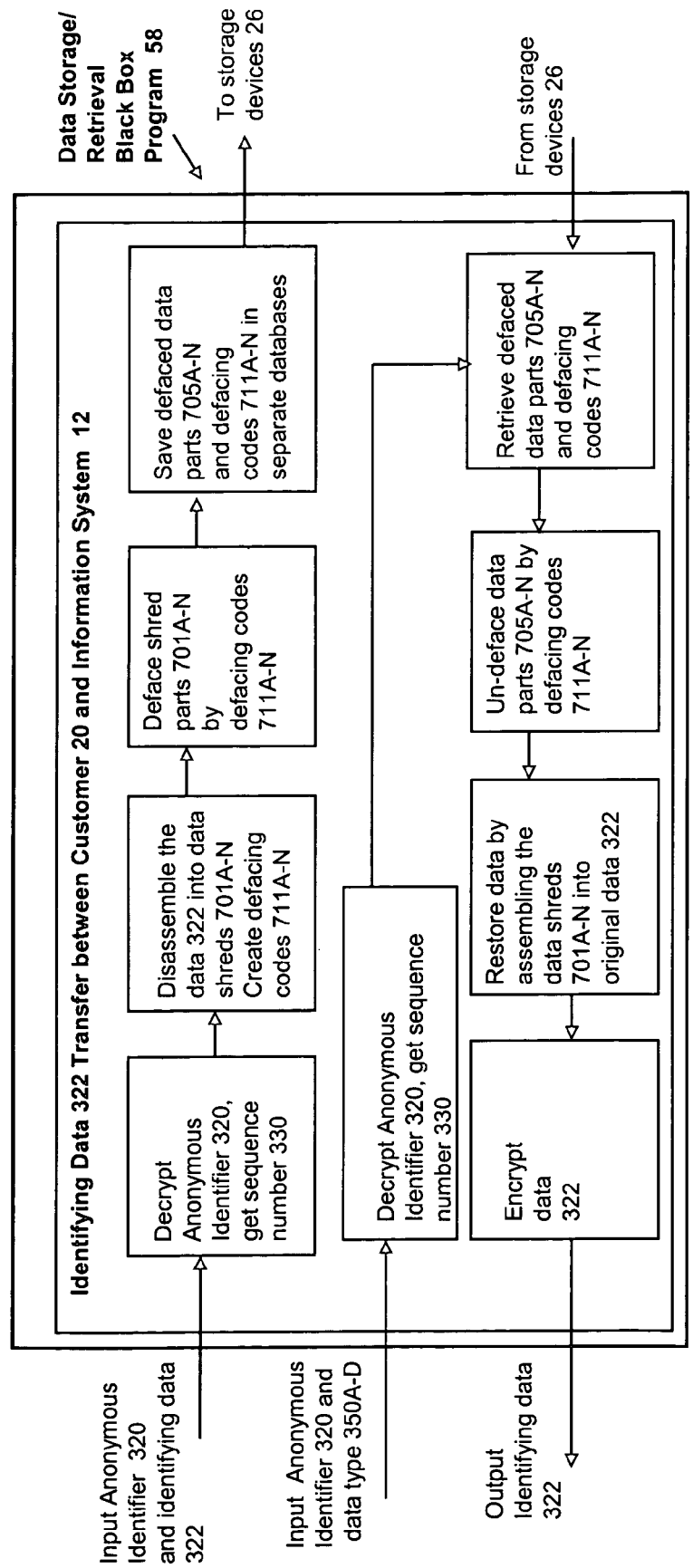
Figure 6C:
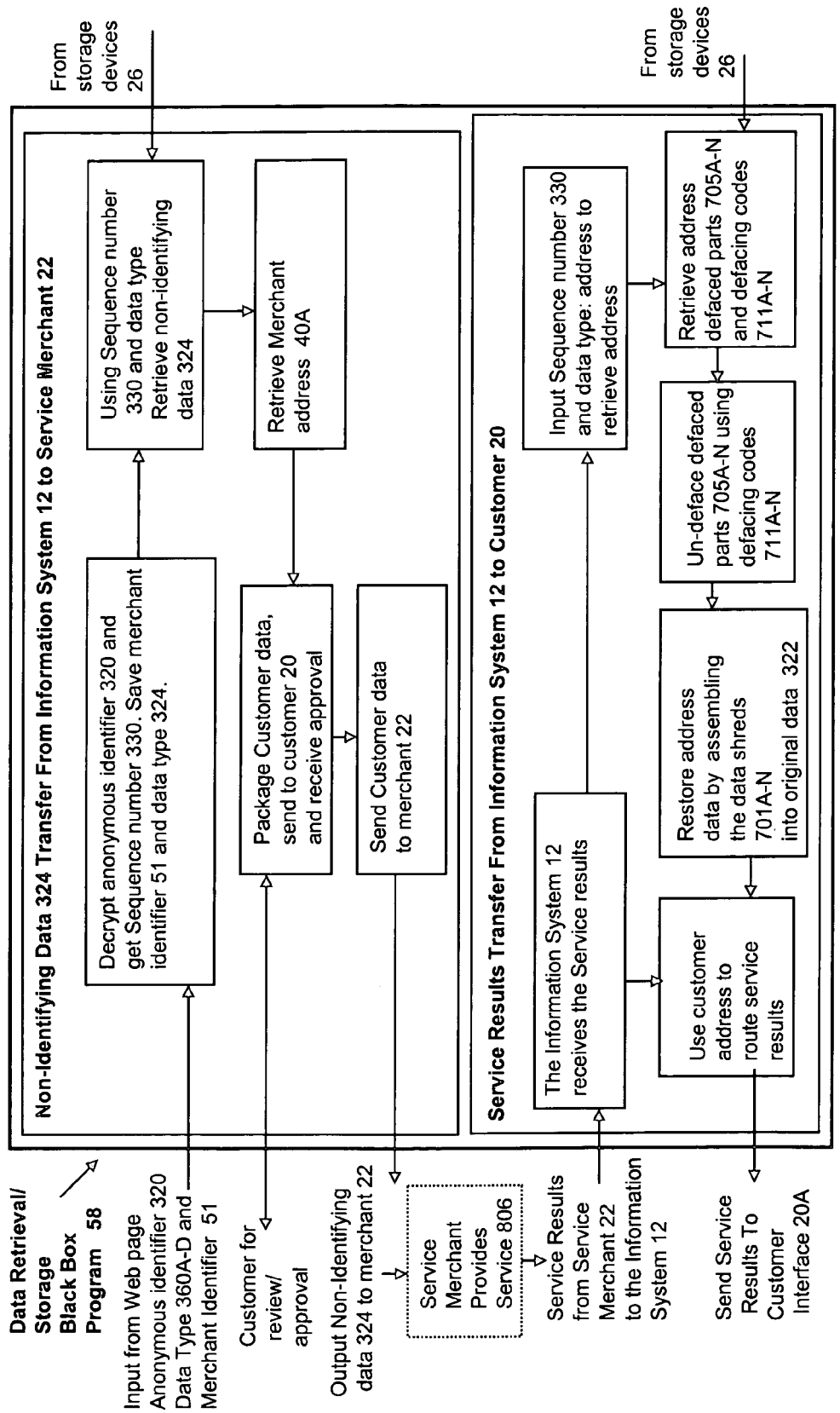

FIGS. 6A, 6B and 6C illustrate four operations of the transfer of information between the customer 20 and the information system 12. The operations include (i) the transfer of non-identifying data 324 between the customer 20 and the information system 12, (ii) the transfer of identifying data 322 between the customer 20 and the information system 12, (iii) the transfer of non-identifying data 324 from the information system 12 to the service merchant 22, and (iv) the transfer of service results from the information system 12 to the customer 20.

With reference to FIG. 6A, for transferring non-identifying data 324 from the customer 20 to the information system 12, the user 20 inputs the anonymous identifier 320 and the non-identifying data 324 into the information system 12 via the customer interface 20A. The program 58 is operative with the system processor 30 to locate the anonymous identifier 320 from the identifier database 38A and obtain the sequence number 330. Subsequently, the information system 12 saves the non-identifying data 324 into the non-identifying database 38C in storage device 26.

For retrieving non-identifying data 324, the user 20 inputs their anonymous identifier 320 and the requested data type 360A–D into the information system 12 via the customer interface 20A. The program 58 is operative with the system processor 30 of the information system 12 to (i) decrypt the anonymous identifier 320, (ii) gain access to the corresponding sequence number 330, (iii) retrieve the specified data 324 from storage device 26, (iv) optionally encrypts the data 324 and (v) outputs the data 324 to the user 20.

With reference to FIG. 6B, for storing identifying data 322, the user 20 inputs their anonymous identifier 320 and the identifying data 322 into the information system 12 via the customer interface 20A. The program 58 is operative with the system processor 30 to decrypt the anonymous identifier 320 and the data 322. The program 58 is operative with the system processor 30 to (i) shred the identifying data 322 into the plurality of data shreds 701A–N, (ii) create a corresponding defacing code 711A–N for each of the data shreds 701A–N, (iii) deface each of the data shreds 701A–N to get the defaced parts 705A–N using the defacing codes 711A–N, and (iv) save the defaced parts 705A–N in separate databases in one or more storage devices.

For retrieving identifying data 322, the user 20 inputs their anonymous identifier 320 and requests the identifying data type 350A–D. The program 58 is operative with the system processor 30 to decrypt the anonymous identifier 320 and get the sequence number 330. The program 58 is operative with the system processor 30 to (i) retrieve the defaced parts 705A–N from the one or more storage devices, (ii) retrieve the defacing codes 711A–N from store device 26, (iii) restore the data shreds 701A–N by reversing the defacing of defaced parts 705A–N using the defacing codes 711A–N, (iv) assembly the data shreds 701A–701N into the original identifying data 322, (v) encrypt the assembled identifying data 322 and (vi) output the identifying data 322 to the user 20.

FIG. 6C illustrates the transfer of non-identifying data 324 from the information system 12 to the service merchant 22 and the transfer of the service results from the merchant 22 to the customer 20. Initially, the customer 20 is accessing a web page of the merchant 22. Subsequently, the information system 12 receives notice that customer 20 wants to anonymously transfer non-identifying data 324 from the information system 12 to the merchant 22. The information system 12 receives the anonymous identifier 320, the request for the non-identifying data type 360A–D and a merchant identifier 51.

The information system 12 decrypts the anonymous identifier 320, locates the anonymous identifier 320 in the identifier database 38A and obtains the corresponding sequence number 330 from the identifier database 38A. Using the sequence number 330, the requested data type 360A–D of the non-identifying data 324 is obtained from the database 38C. The information system 12 accesses the merchant database 40 to obtain a merchant address 40A. The requested data 324 is packaged with the merchant identifier 51, the merchant address 40A, the sequence number 330 and sent to the customer 20 for review and approval. The merchant identifier 51 can be any string of characters that is used to identify the merchant 22 to the information system 12. The customer 20 receives the requested data 324 on the customer interface 20A. The customer 20 reviews the requested data 324 and responds with the approval to forward the requested data 324 from the information system 12 to the merchant interface 22A.

Alternatively, instead of the sequence number 330, the unique merchant/customer identifier 52 (illustrated in FIG. 2) may be used. The merchant/customer identifier 52 is a string of characters that is unique for each merchant 22, for each customer 20. The merchant/customer identifier 52 further shields the identity of the customer 20 from the merchants 22. The merchant/customer identifier 52 is also helpful when one merchant 22 merges or buys another merchant 22 and may learn that the customer 20 of one merchant 22 and another merchant 22 are the one and the same customer. This is also helpful when the merchants 22 choose to share or sell to each other their customer information. The merchant/customer identifier 52 can be randomly generated by the information system 12.

The information system 12 sends the requested non-identifying data 324 to the merchant 22. The merchant 22 receives the non-identifying data 324 from the information system 12 via the merchant interface 22A. The merchant 22 can use the non-identifying data 324 to provide an estimate for a service and/or provide the service. Next, the merchant 22 sends the results to the information system 12.

The Information system 12 receives the service results and forwards the service results to the customer 20. More specifically, the information system 12 uses the sequence number 330 to retrieve the electronic mail address of the customer 20. After retrieving the electronic mail address, the results are forwarded to the customer 20 via the customer interface 20A using the electronic mail address of the customer 20. Alternatively the results may be forwarded to the customer 20 using other ways, such mail using the post office or express mail.

Information System Web Pages

As provided herein, the information system program 28 is operative with the information system processor 30 to generate one or more web pages on the world wide web. The web pages allow each customer 20 to provide information through the customer interface 20A to the information system 12. Alternately, for example, instead of the world wide web, the customer 20 can provide some or all of the information to the information system 12 via voice mail, facsimile, or postal mail transmissions.

Figure 9A:
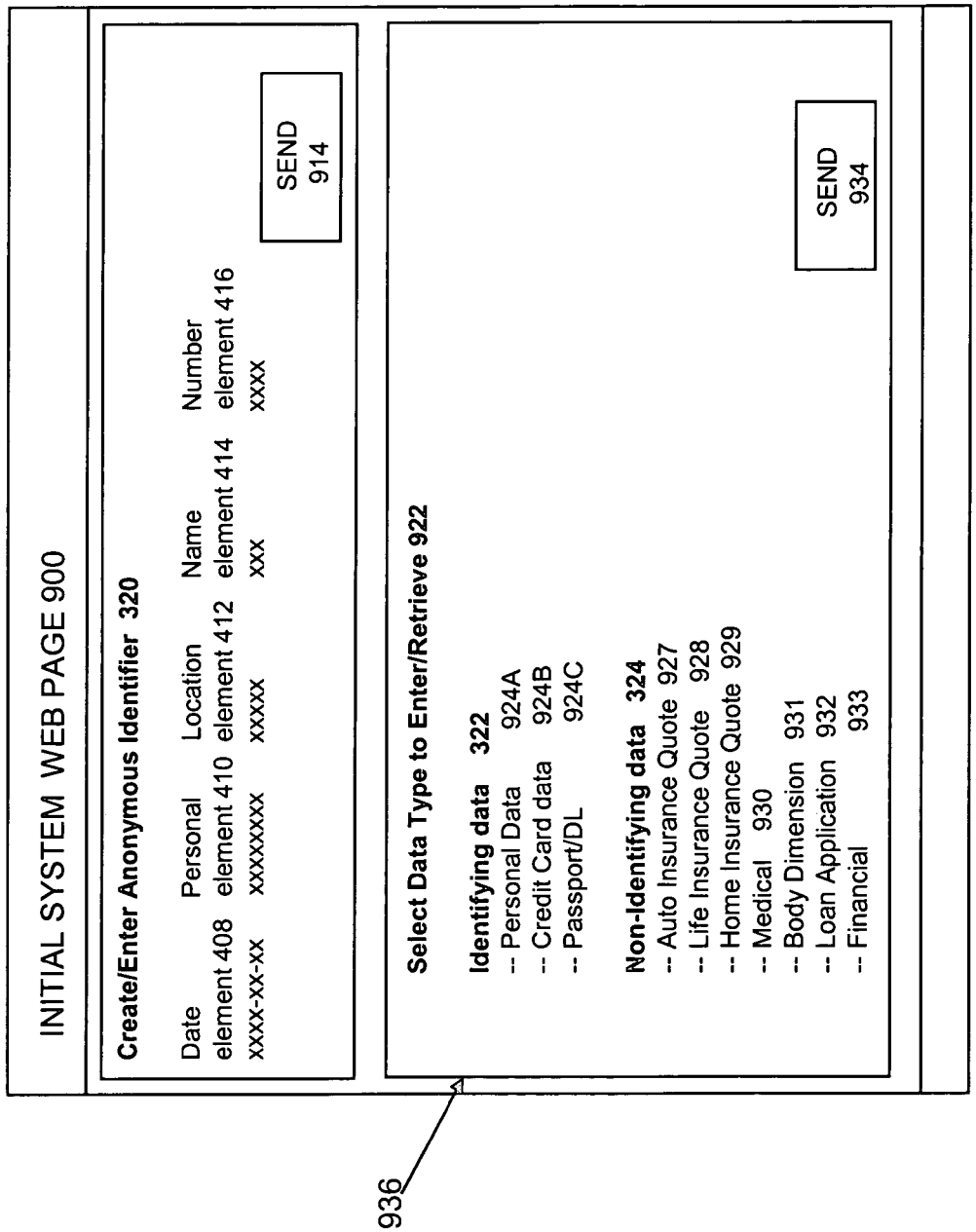

FIG. 9A illustrates an initial system web page 900 having features of the present invention. The initial system web page 900 can be displayed on the customer interface 20A when the customer 20 first registers with the information system 12 or immediately prior to making the first service transaction with a merchant 22 with the information system 12.

The initial system web page 900 includes (i) entry of an anonymous identifier 320, (ii) spaces for entering the data element 408, the personal element 410, the location element 412, the name element 414 and the number element 416 of the anonymous identifier 320 of the customer 20 and (iii) a SEND icon 914.

After the customer 20 enters the required information and clicks the SEND icon 914, the information system 12 receives and validates the anonymous identifier 320. Subsequently, the information system 12 generates a data type page 936 that allows the customer 20 to select a particular data type from the identifying data 322 and non-identifying data 324. The data type page 936 displays (I) Select Data Type to Enter/Retrieve 922 and specifies data types in categories of identifying data 322 and non-identifying data 324. The data type page 936 also displays data types of personal data 924A, credit card data 924B, passport/Driver License data 924C, auto insurance data 927, Life insurance data 928, home insurance data 929, medical data 930, body dimension data 931, loan application data 932 and financial data 933 as a simplified illustration.

After selection of a data type and clicking SEND icon 934, the appropriate data type form is displayed. FIG. 9B illustrates an identifying data web page 950 for entering personal data form 924A. FIG. 9C shows a simplified illustration of a non-identifying data web page 940 for filling an auto insurance data form 927.

Anonymous Service Transactions Using the Information System

Service merchants 22 are those who provide service to a customer 20. Many service merchants 22 have established virtual services that can be accessed on the Internet. Some examples of such virtual services are completing loan applications, getting insurance quotes and completing tax forms.

A typical Internet service transaction involves (i) the customer 20 browsing the virtual store of a particular service merchant 22, (ii) the customer 20 providing personal information to the service merchant 22, and (iii) the service merchant 22 providing the service and/or an estimate on the service. The personal information provided by the customer 20 typically includes at least the name and e-mail address, may also include credit card information of the customer and other information of the customer relevant to the service. With this information, the merchant 22 provides an estimate on the service, provides the service, charges the credit card of the customer and/or delivers the service results to the customer.

Many times the service merchant 22 collects the personal information of the customer 20 and distributes the personal information the actual service providers. For example, a mortgage loan application may be received by a web service merchant 22 and then passed on to different mortgage lenders to get a quote on the loan terms, which are then provided to the customer to make a final selection.

The service merchants 22 may provide the service for free and make revenue by use of advertising while others may charge a fee for their service. Some services may include an item delivery in addition to a service. An example is a custom tailor.

Service Merchant Web Pages

FIGS. 8A and 8B illustrate simplified merchant web pages of an auto insurance merchant 800 and a custom tailor merchant 802, respectively.

The auto insurance merchant 804 may provide for an auto insurance quote form 806 that requires the customer 20 input the desired liability insurance amount 808, the desired collision/comprehensive insurance amount 810 and requires the completion of an insurance application 812 including the personal data 814 of the customer 20. The customer 20 may submit an insurance application anonymously by clicking the Apply with the Information System icon 816. On clicking of icon 816, the information system 12 can display a web page 980 similar to that illustrated in FIG. 9D. The web page 980 carries over the service merchant id 982, the data entered by the user for auto insurance quote 983 specifying liability amount 984 and collision amount 985. This web page provides a space for the entry of the Anonymous Identifier 986 and data type as auto insurance 987. On clicking Send icon 989 the information system 12 forwards the data from the information system 12 to the service merchant 22. The service merchant 22 responds with service results in the form of quote or query to the customer via merchant/customer identifier.

After receiving multiple quotes, the customer 20 may select one quote and choose to enter into a binding relationship by contacting the service merchant 22 directly and revealing the customer identity.

FIG. 8B illustrates a simplified Web page 802 for a custom tailor merchant 820. It may provide for custom tailor service and ask for entry of fabric selection 822, item selection 824, design/style selection 826 and ask for personal data 828 in the form of identifying data, body dimension data and payment data. A customer may receive custom tailor service anonymously by clicking Apply with information system icon 830.

Upon clicking of icon 830, the information system 12 displays a web page 990 as shown in FIG. 9E. The web page 990 carries over the service merchant id 991, the data entered by the user 20 for custom tailor service fabric 993, style 994 and item 995. The web page 990 provides a space for the entry of the anonymous identifier 996, data type as body 997 and payment type 998. On clicking Send button 999, the information system 12 forwards the user data from the information system 12 to the service merchant 22. The service merchant 22 responds with service results in the form of delivery of the custom tailor item to the customer via merchant/customer identifier.

Operation

Figure 10:
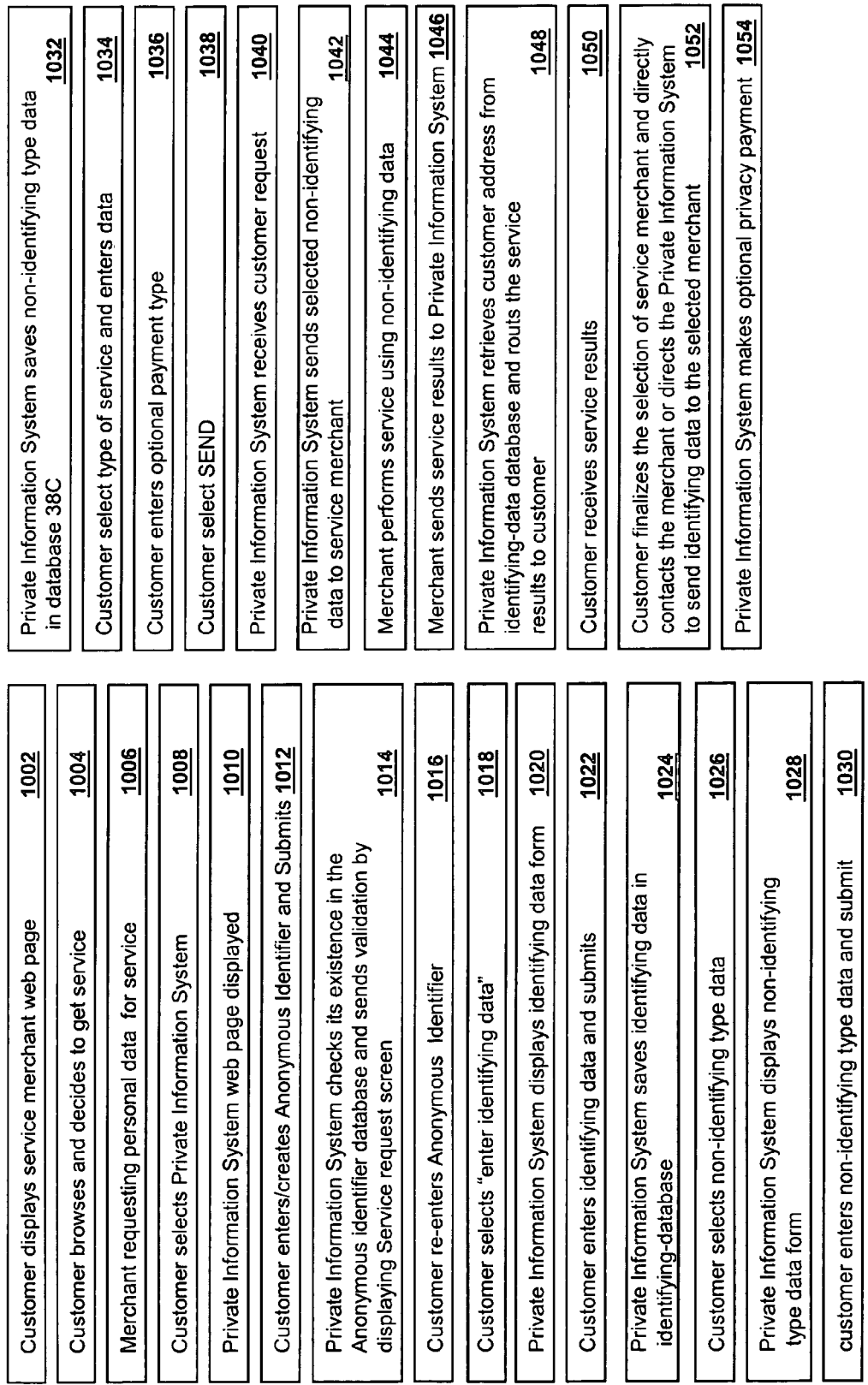
FIG. 10 is block diagram that outlines the operation of a method and apparatus having features of the present invention.

The operation of the apparatus 10 and information system 12 for a service transaction can be further understood with reference to the flow chart illustrated in FIG. 10. Importantly, the order of some or all of the steps can be varied. Further, not all of the steps outlined below are necessary to perform an anonymous transaction pursuant to the present invention.

At step 1002 the customer 20 uses the customer interface 20A to display the web page of the service merchant 22. At step 1004 the customer 20 decides to get the service and provides/enters service specific data on the merchant web page using the customer interface 20A. At step 1006 the Customer 20 selects the apply with the information system icon. Clicking the icon makes a connection with the information system 12 and transfers data from the merchant web page to the information system 12. At step 1010 the information system 12 generates the information system web page on the customer interface 20A and carries over and displays the merchant identifier and the service specific entries provided earlier by the customer 20 in the merchant web page.

At step 1012 the customer 20 creates/enters the anonymous identifier 320 and transfers the data to the information system 12. At step 1014 the information system 12 checks for the existence of the anonymous identifier 320 in the identifier database 38A and displays to the customer 20 in a form that outlines the service specific non-identifying data. An example of service specific form is in FIG. 9C. The service specific form may already be filled in with data already provided by the customer to the information system 12. In which case the customer reviews and approves for transmission to the merchant 22. Or the form may be not filled in, allowing the customer to fill in the data and send to the merchant.

If it is a new anonymous identifier as validated in the earlier step 1014, the information system may respond by sending the initial system web page 900. At step 1016 the customer re-enters the anonymous identifier on the Initial web page 900 and SENDS which displays part of web page 936 allowing entry of data. At step 1018 the customer selects "enter identifying data". At step 1020 the information system displays the identifying data form. At step 1022 the customer enters identifying data and SENDS. At step 1024 the information system saves the identifying data in identifying database 38B. At step 1026 the customer selects the non-identifying type data. At step 1028 the information system displays the non-identifying type data form. At step 1030 the customer enters the non-identifying type data and SENDS. At step 1032 the information system saves the non-identifying type data in database 38C. At step 1034 the customer selects the type of service and enters the data. At step 1038 the customer enters optional payment type. At step 1038 the customer selects the SEND icon. At step 1040 the information system receives the customer request. At step 1042 the information system sends the selected non-identifying data to the service merchant. At step 1044 the merchant performs the service using the non-identifying data. At step 1046 the merchant sends the service results to the information system. At step 1048 the information system using the sequence number finds the customer address and routs the service results to the customer. At step 1050 the customer receives the service results. At step 1052 the customer finalizes the selection of the service merchant and directly contacts the merchant or directs the information system 12 to send identifying data to the selected merchant.

In summary, the information system 12 allows the customer 20 to maintain private data 25 anonymously and to receive a service from the service merchant 22 without disclosing the name, address, private data and credit card information of the customer 20 to the merchant 22. Further, the information system 12 allows the service results to be delivered to the customer 20 without the merchant 22 having access to the delivery information of the customer 20. Basically, the information system 12 minimizes the number of people, businesses and institutions that have access to the private information of the customer 20. This minimizes the opportunity for the private information of the customer 20 to be improperly disseminated.

While the particular apparatus 10 and method as illustrated herein and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An information system for storing personal data of a data owner in data servers on a global computer network, comprising;
   a. a receiving function that receives,
      (i) an access key,
      (ii) personal data of identifying data type that if used by itself is sufficient to identify the data owner, and
      (iii) personal data of non-identifying data type that by itself is insufficient to identify the data owner;
   b. a defacing function that parses the identifying data into shreds that preserve the character of the identifying data, for each of these shreds maintains a random order list of shreds, aliases each shred with another shred from the corresponding list, and saves defaced identifying data made of these aliased shreds, and the non-identifying data in the data servers using the access key as a reference.

2. The system as in claim 1, further comprising: the receiving function requires entry of an access key made up of a structured sequence of at least three entries that have a format from the group that includes a calendar date, a personal phrase, name abbreviations, an address zip code, and a four-digit personal number.

3. The system as in claim 2, comprising: a mapping function that maps the access key into a sequence number and saves the mapping into a first data server and references the personal data in a second data server by the sequence number.

4. The system as in claim 1, wherein the identifying data comprising: data from a group that includes (i) name, (ii) address, (iii) telephone number, (iv) e-mail address, (v) bankcard data, (vi) driver license data, and (vii) social security number.

5. The system as in claim 1, wherein the non-identifying data comprising data from a group that includes (i) financial data that supports a loan application, (ii) income and deduction data that supports a tax calculation, (iii) insurance data that supports a life, health, and auto insurance quotation, (iv) health data that supports a health examination, health diagnosis and treatment, and (v) body dimension data that supports a custom tailoring and fitting of wear articles.

6. The system as in claim 1, wherein the defacing function comprising:
   a. a sub-function shredding the identifying data of a name into first, middle and last name shreds;
   b. a sub-function maintaining random order lists of each of these types of names;
   c. a sub-function identifying the position of each shred in the lists, creating modified list positions by applying random offsets to the positions, finding names from the lists corresponding to the modified list positions and saving the defaced names and the random offsets in the data server.

7. The system as in claim 1, wherein the defacing function comprising:
   a. a sub-function shredding identifying data having an alphanumeric string into individual digits;
   b. a sub-function maintaining random order lists of alphabets and numerals that comprise the string;
   c. a sub-function identifying the position of each digit in the lists, creating modified list positions by applying random offsets, finding the digits from the lists corresponding to the modified list positions and saving the defaced digits and the random offsets in the data servers.

8. The system as in claim 1, wherein the defacing function comprising:
   a. a sub-function shredding identifying data of address into street name, city name and state name;
   b. a sub-function maintaining random order lists of each of these types of names;
   c. a sub-function identifying the position of each shred in the lists, creating modified list positions by applying random offsets, finding the names from the lists corresponding to the modified list positions and saving the defaced names and the random offsets in the data servers.

9. The system as in claim 1, wherein the defacing function comprising:
   a. a sub-function shredding identifying data of e-mail address into digits of name and e-mail server name;
   b. a sub-function maintaining random order lists of alphabets, numerals and e-mail server names;
   c. a sub-function identifying the position of each shred in the lists, creating modified list positions by applying random offsets, finding the names from the lists corresponding to the modified list positions and saving the defaced names and the random offsets in the data servers.

10. The system as in claim 1, having a function for retrieving the identifying data, comprising:
   a. a sub-function for receiving the access key and type of identifying data to be retrieved and retrieving the corresponding defaced data from the data servers;
   b. an un-defacing function that uses aliased data shreds and using the random order lists of the shreds recreates the identity data, sends to the data owner and immediately deletes the recreated data.

11. The system as in claim 1, having a function for retrieving non-identifying data, comprising:
   a. a sub-function for receiving the access key and type of non-identifying data to be retrieved;
   b. a sub-function for retrieving the corresponding non-identifying data from the data servers and sending to the data owner.

12. The system as in claim 1, further comprising:
a function enabling conducting a service transaction by the data owner with a service provider, the function having, (i) a sub-function transferring selected non-identity data to the service provider, (ii) a sub-function receiving results from the service provider, (iii) a sub-function un-defacing a part of identity data necessary to forward the service results and (iv) a sub-function forwarding the service results to the data owner and immediately deleting the identity data used for forwarding.

13. The system as in claim 1 having a function enabling conducting a service transaction by the data owner with a service provider comprising:
   a. a function receiving, from a service provider web page, a service selection and a service specific data;
   b. a function displaying a web page for entry of the access key, receiving the entry of the access key, displaying types of non-identifying data, receiving selection of the non-identifying data required for the service;
   c. a function retrieving the selected non-identifying data, creating a transaction reference, and sending the service specific data, the non-identifying data and the transaction reference to the service provider, the data servers having pre-stored data specific to the service provider enabling contacting the service provider.

14. The system as in claim 13, for service transactions requiring a service fee, having a function comprising:
   a. a function retrieving and un-defacing identity data of bankcard;
   b. a function connecting to a bankcard processing network, providing the bankcard data for collecting funds equal to a service charge from the data owner, and immediately deleting the bankcard data; and
   c. a sub-function forwarding the service charge, identified by the transaction reference, to the service provider.

15. A system for protecting identity data in data servers while being stored there comprising:
   a. a receiving function that receives, an access key and the identity data;
   b. a defacing function that parses the identifying data into shreds that preserve the character of the identifying data, for each of these shreds maintains a random order list of shreds, aliases each shred with another shred from the corresponding list;
   c. a mapping function that maps the access key to a sequence number, saves the mapping in a first data server and saves the defaced identity data in a second data server anchored by the sequence number.

16. The system as in claim 15, wherein the defacing function comprising:
   a. a sub-function shredding identity data into name-character and non-name character data;
   b. a sub-function maintaining a first group lists of random order name-character data and a second group lists of random order alphabets and numerals;
   c. a sub-function identifying the position of each name data in the first group of lists, creating modified list positions by applying random offsets, finding the name from the lists corresponding to the modified list positions and saving the defaced names and the random offsets in the second data server anchored by the sequence key;
   d. a sub-function identifying the position of each digit of the non-name data in the second group of lists, creating modified list positions by applying random offsets, finding the digit from the lists corresponding to the modified list positions and saving the defaced digits and the random offsets in the second data server anchored by the sequence number.

17. The system as in claim 16, wherein the sub-function of applying random offsets comprising: a function that applies a plurality of random offsets and to each of these plurality of offsets uses an operator from a group of operators that includes addition and subtraction.

18. A method of storing personal data of a data owner in data servers on a global computer network, comprising the steps of:
   a. entering an access key;
   b. entering personal data of identifying data type that is sufficient to identify the data owner;

c. entering personal data of non-identifying data type that by itself is insufficient to identify the data owner;

d. defacing the identifying data by parsing into shreds that preserve the character of the identifying data, for each of these shreds maintaining a random order list of shreds, aliasing each shred with another shred from the corresponding list, and saving the defaced identifying data made of these aliased shreds and the non-identifying data in the data servers using the access key as a reference.

19. The method as in claim 18, further comprising the step of: requiring entry for the access key of a structured sequence of at least three entries that have a format from the group that includes a calendar date, a personal phrase, name abbreviations, an address zip code, and a four-digit personal number.

20. The method as in claim 19, comprising the step of: mapping the access key into a sequence number, saving the mapping into a first data server, and referencing the personal data in a second data server by the sequence number.

21. The method as in claim 18, wherein the Identifying data comprising: entering data from a group that includes (i) name, (ii) address, (iii) telephone number, (iv) e-mail address, (v) bankcard data, (vi) driver license data, and (vii) social security number.

22. The method as in claim 18, wherein the step of defacing identifying data comprising the steps of:
   a. shredding the identifying data of a name into first, middle and last name shreds;
   b. maintaining random order lists of each of these types of names;
   c. identifying the position of each shred in the lists, creating modified list positions by applying random offsets to the positions, finding names from the lists corresponding to the modified list positions and saving the defaced names and the random offsets in the data servers.

23. The method as in claim 18, wherein the step of defacing the identifying data comprising the steps of:
   a. shredding identifying data having an alphanumeric string into individual digits;
   b. maintaining random order lists of alphabets and numerals that comprise the string;
   c. identifying the position of each digit in the lists, creating modified list positions by applying random offsets, finding the digits from the lists corresponding to the modified list positions and saving the defaced digits and the random offsets in the data servers.

24. The method as in claim 18, wherein the step of defacing identifying data comprising the steps of:
   a. shredding identifying data of an address into street name, city name and state name;
   b. maintaining random order lists of each of these types of names;
   c. identifying the position of each shred in the lists, creating modified list positions by applying random offsets, finding the names from the lists corresponding to the modified list positions and saving the defaced names and the random offsets in the data servers.

25. The method as in claim 18, wherein the step of defacing comprising the steps of:
   a. shredding identifying data of e-mail address into digits of name and e-mail server name;
   b. maintaining random order lists of alphabets, numerals and e-mail server names;
   c. identifying the position of each shred in the lists, creating modified list positions by applying random offsets, finding the names from the lists corresponding to the modified list positions and saving the defaced names and the random offsets in the data servers.

26. The method as in claim 18, for retrieving the identifying data, comprising steps of:
   a. entering the access key and selecting identifying data to be retrieved;
   b. retrieving the corresponding defaced data from the data servers;
   c. recreating the identity data by un-defacing it, by using aliased data shreds and using the random order lists of the shreds, and sending to the data owner and immediately deleting the recreated data.

27. The method as in claim 18, for retrieving the non-identifying data, comprising steps of:
   a. entering the access key and selecting non-identifying type of personal data to be retrieved;
   b. retrieving the corresponding non-identifying data from the data servers and sending to the data owner.

28. The method as in claim 18, enabling conducting a service transaction by the data owner with a service provider comprising the steps of:
   a. transferring selected non-identity data to the service provider;
   b. receiving results from the service provider;
   c. un-defacing a part of identity data necessary to forward the service results, using aliased data shreds and using the random order lists of the shreds; and
   d. forwarding the service results to the data owner and immediately deleting the identity data used for forwarding.

29. The method as in claim 18, enabling conducting a service transaction by the data owner with a service provider comprising further steps of:
   a. browsing a service provider web page, selecting service and providing service specific data, linking to a processing server from the web page and transferring the service specific data to the processing server;
   b. the processing server displaying a web page for entry of the access key, entering the access key, the processing server displaying types of non-identifying data, and selecting the non-identifying data required for the service;
   c. the processing server retrieving the non-identifying data, creating a transaction reference, and sending the service specific data, the non-identifying data and the transaction reference to the service provider, the data servers pre-storing data specific to the service provider enabling contacting the service provider.

30. The method as in claim 29, for service transactions requiring a service fee comprising further steps of:
   a. retrieving defaced bankcard identity data from the data servers, un-defacing the bankcard data;
   b. the processing server connecting to a bankcard processing network, providing the bankcard data for collecting funds equal to a service charge from the data owner, and immediately deleting the bankcard data; and
   c. forwarding the service charge, identified by the transaction reference, to the service provider.

31. The method as in claim 18, wherein the non-identifying data comprising: entering data from a group that includes (i) financial data that supports a loan application, (ii) income and deduction data that supports a tax calculation, (iii) insurance data that supports a life, health, and auto insurance quotation, (iv) health data that supports a health examination, health diagnosis and treatment, and (v) body dimension data that supports a custom tailoring and fitting of wear articles.

32. A method of protecting identity data in data servers while being stored there comprising the steps of:
   a. a data owner entering an access key and entering identity data from a group that includes (i) name, (ii) address, (iii) telephone number, (iv) e-mail address, (v) bankcard data, (vi) driver license data, (vii) social security number, and sending to the data servers; and
   b. defacing the identity data by parsing into shreds that preserve the character of the identity data, for each of these shreds maintaining a random order list of shreds, aliasing each shred with another shred from the corresponding list, and saving the defaced identity data made of these aliased shreds in the data servers using the access key as a reference.

33. The claim as in 32, wherein the step of defacing identity data comprising the steps of:
   a. shredding identity data into name-character and non-name character data shreds;
   b. maintaining a first group lists of random order name-character data shreds and a second group lists of random order of alphabets and numerals;
   c. identifying the position of each name shred data in the first group of lists, creating modified list positions by applying random offsets, finding a name shred from the lists corresponding to the modified list positions and saving the defaced name shreds and the random offsets in the data servers;
   d. identifying the position of each digit of the non-name data in the second group of lists, creating modified list positions by applying random offsets, finding a digit from the lists corresponding to the modified list positions and saving the defaced digits and the random offsets in the data servers.

34. The claim as in 33, wherein the step of applying random offsets comprising the steps of: applying a plurality of random offsets and for each of the plurality of offsets using an operator from a group that includes addition and subtraction.

35. A method of saving and securing personal data related to a person in a private information bank system comprising the steps of:
   a. requiring an initial entry of a structured access key into a computer system of the private information bank, the system assigning a sequence number to the access key and saving the access key and the sequence number in a storage of the computer system;
   b. entering personal data divided as identity data and non-identity data into the computer system, the system shredding the identity data into name-type shreds and non-name-type shreds, wherein for each shred type, a plurality of random order list of shreds of that type being maintained in the computer system, the system defacing each shred into an equivalent shred using the random order shred lists, and saving the defaced shreds as an equivalent identity data and the non-identity data anchored by the sequence number in the storage.

36. The method as in claim 35, including a method of retrieving personal data from the private information bank, comprising the steps of:
   a. requiring a subsequent entry of the structured access key into the computer system;
   b. specifying the non-identity data to be retrieved and specifying a recipient address;
   c. mapping the access key to the sequence number, finding the non-identity data from the sequence number, and delivering it to the recipient.

37. The method as in claim 35, including a method of retrieving personal data from the private information bank, comprising the steps of:
   a. requiring a subsequent entry of the structured access key into the computer system;
   b. specifying the identity data to be retrieved and specifying a recipient address;
   c. mapping the access key to the sequence number and finding the equivalent identity data;
   d. recreating the identity data from the equivalent identity data using the random order shred lists and delivering it to the recipient.

38. The method as in claim 35, further, comprising the steps of:
   a. storing the access key and the assigned sequence number in one part of the storage;
   b. storing the equivalent identity data anchored by the sequence number in another part of the storage;
   c. storing the non-identity data anchored by the sequence number in yet another part of the storage.

* * * * *